US010730551B2

(12) United States Patent
Borud

(10) Patent No.: US 10,730,551 B2
(45) Date of Patent: Aug. 4, 2020

(54) TRACKED ALL-TERRAIN VEHICLE

(71) Applicant: Polaris Industries Inc., Medina, MN (US)

(72) Inventor: Eric Borud, Roseau, MN (US)

(73) Assignee: Polaris Industries Inc., Medina, MN (US)

(*) Notice: Subject to any disclaimer, the term of this patent is extended or adjusted under 35 U.S.C. 154(b) by 340 days.

(21) Appl. No.: 15/232,209

(22) Filed: Aug. 9, 2016

(65) Prior Publication Data

US 2018/0043932 A1 Feb. 15, 2018

(51) Int. Cl.
| | | |
|---|---|---|
| *B62D 11/04* | (2006.01) | |
| *B60L 50/10* | (2019.01) | |
| *B60K 6/46* | (2007.10) | |
| *B60K 6/50* | (2007.10) | |
| *B62D 11/00* | (2006.01) | |
| *B62D 55/06* | (2006.01) | |
| *B62D 55/10* | (2006.01) | |
| *B62D 55/125* | (2006.01) | |

(52) U.S. Cl.
CPC .............. *B62D 11/04* (2013.01); *B60K 6/46* (2013.01); *B60K 6/50* (2013.01); *B60L 50/10* (2019.02); *B62D 11/003* (2013.01); *B62D 55/06* (2013.01); *B62D 55/10* (2013.01); *B62D 55/125* (2013.01); *B60Y 2200/25* (2013.01); *B60Y 2200/92* (2013.01); *B60Y 2400/85* (2013.01); *Y02T 10/646* (2013.01); *Y02T 10/70* (2013.01); *Y02T 10/7077* (2013.01); *Y10S 903/93* (2013.01)

(58) Field of Classification Search
CPC ...... B62D 11/04; B62D 11/003; B62D 55/06; B62D 55/10; B60K 6/46; B60K 6/50
See application file for complete search history.

(56) References Cited

U.S. PATENT DOCUMENTS

| | | |
|---|---|---|
| 1,368,652 A | 2/1921 | Pennington |
| 2,779,636 A | 1/1957 | Allen |
| 2,967,075 A | 1/1961 | Christie |
| 3,262,522 A | 7/1966 | Johnson |
| 3,311,424 A | 3/1967 | Taylor |
| 3,371,734 A | 3/1968 | Zaunberger |
| 3,374,005 A | 3/1968 | Donlon |
| 3,446,303 A | 5/1969 | Trapp |

(Continued)

FOREIGN PATENT DOCUMENTS

| | | |
|---|---|---|
| CA | 2737173 | 11/2012 |
| CN | 1861436 | 11/2006 |

(Continued)

OTHER PUBLICATIONS

Prospector II Track System, available at https://www.powersportsnetwork.com/entusiasts/catalog_item_detail.asp?cattalog=3567&levelcode=33367&product=431802&cattype=&ProductCatergoryCode=,available as early as Dec. 31, 2008; 1 page.

(Continued)

*Primary Examiner* — Jacob D Knutson
*Assistant Examiner* — Michael R Stabley
(74) *Attorney, Agent, or Firm* — Faegre Drinker Biddle & Reath LLP

(57) ABSTRACT

A tracked all-terrain vehicle is shown which includes an internal combustion engine, an electric generator, and a plurality of electric motors which drive movement of the tracks of the tracked all-terrain vehicle.

28 Claims, 21 Drawing Sheets

(56) References Cited

U.S. PATENT DOCUMENTS

| | | | |
|---|---|---|---|
| 3,698,500 A | 10/1972 | Jernigan | |
| 4,458,955 A | 7/1984 | Webb | |
| 4,544,170 A | 10/1985 | Ebert | |
| 4,998,591 A | 3/1991 | Zaunberger | |
| 5,168,946 A | 12/1992 | Dorgan | |
| 5,273,126 A | 12/1993 | Reed | |
| 5,318,142 A * | 6/1994 | Bates | B60K 6/28 180/65.245 |
| 5,409,075 A | 4/1995 | Nieman | |
| 5,503,238 A | 4/1996 | Urbanek | |
| 5,692,579 A | 12/1997 | Peppel | |
| 5,944,134 A | 8/1999 | Peppel | |
| 6,009,966 A | 1/2000 | Olson | |
| 6,125,958 A | 10/2000 | Olson | |
| 6,311,798 B1 | 11/2001 | Anderson | |
| 6,328,124 B1 | 12/2001 | Olson | |
| 6,343,666 B1 | 2/2002 | Olson | |
| 6,431,561 B1 | 8/2002 | Hedlund | |
| RE38,124 E | 5/2003 | Mallette | |
| 6,615,885 B1 | 9/2003 | Ohm | |
| 6,691,806 B2 | 2/2004 | Zahnradfabrik | |
| 6,942,050 B1 | 9/2005 | Mallette | |
| 6,953,408 B2 | 10/2005 | Thompson | |
| 6,955,237 B1 | 10/2005 | Przekwas | |
| 6,962,222 B2 | 11/2005 | Kirihata | |
| 7,080,704 B1 | 7/2006 | Kerner | |
| 7,089,917 B1 | 8/2006 | McKinster | |
| 7,128,176 B1 | 10/2006 | Mills | |
| 7,147,074 B1 | 12/2006 | Berg | |
| 7,328,943 B2 | 2/2008 | Johnson | |
| 7,360,613 B2 | 4/2008 | Hasegawa | |
| 7,401,674 B1 | 7/2008 | Berg | |
| 7,410,022 B1 | 8/2008 | Berg | |
| 7,644,788 B2 | 1/2010 | Scheetz | |
| 7,739,005 B1 * | 6/2010 | Tang | B60L 3/10 701/22 |
| 7,848,584 B2 | 12/2010 | Monro | |
| 7,854,285 B1 | 12/2010 | Giese | |
| 7,918,299 B2 | 4/2011 | Yoshihara | |
| 7,967,087 B2 | 6/2011 | Arulraja | |
| 8,100,205 B2 | 1/2012 | Gettings | |
| 8,147,007 B2 | 4/2012 | Rainer | |
| 8,151,923 B1 | 10/2012 | Giese | |
| 8,479,860 B1 | 7/2013 | Jorgenson | |
| 8,499,877 B1 | 8/2013 | Giese | |
| 8,567,546 B2 | 10/2013 | Berg | |
| 8,708,069 B2 | 4/2014 | Allaire | |
| 8,733,773 B2 | 5/2014 | Sampson | |
| 8,820,458 B2 | 9/2014 | Giese | |
| 8,844,665 B2 | 9/2014 | Wenger | |
| 8,857,079 B2 | 10/2014 | Mueller | |
| 8,919,477 B2 | 12/2014 | Conn | |
| 8,936,122 B2 | 1/2015 | MacGregor | |
| 8,944,204 B2 | 2/2015 | Ripley | |
| 8,978,794 B2 | 3/2015 | Giese | |
| 8,991,528 B2 * | 3/2015 | Hellholm | B60K 6/46 180/14.2 |
| 9,096,133 B2 | 8/2015 | Kohler | |
| 9,096,289 B2 | 8/2015 | Hedlund | |
| 9,139,255 B1 | 9/2015 | Glissmeyer | |
| 9,248,886 B1 | 2/2016 | Giese | |
| 9,352,802 B2 | 5/2016 | Sampson | |
| 9,428,232 B2 | 8/2016 | Ripley | |
| 9,540,072 B2 | 1/2017 | Hedlund | |
| 2003/0015356 A1 | 1/2003 | Wolfgang | |
| 2006/0157290 A1 | 7/2006 | Wenger | |
| 2006/0249316 A1 | 11/2006 | Buller | |
| 2009/0166101 A1 | 7/2009 | Wenger | |
| 2010/0276990 A1 | 11/2010 | Zuchoski | |
| 2011/0240382 A1 | 10/2011 | Gettings | |
| 2011/0301824 A1 | 12/2011 | Nelson | |
| 2012/0073527 A1 | 3/2012 | Oltmans | |
| 2012/0255799 A1 | 10/2012 | Kohler | |
| 2013/0033070 A1 | 2/2013 | Kinsman | |
| 2013/0048396 A1 | 2/2013 | Neilson | |
| 2013/0096790 A1 | 4/2013 | Nelson | |
| 2014/0102293 A1 | 4/2014 | Miller | |
| 2014/0288763 A1 | 9/2014 | Bennett | |

FOREIGN PATENT DOCUMENTS

| | | |
|---|---|---|
| CN | 1308163 | 4/2007 |
| CN | 101168369 | 4/2008 |
| CN | 103930308 | 7/2014 |
| CN | 105050886 | 11/2015 |
| DE | 1174182 | 7/1964 |
| DE | 19537945 | 4/1997 |
| DE | 19631012 | 2/1998 |
| DE | 102004050436 | 4/2006 |
| EP | 2565068 | 3/2013 |
| JP | 2-286470 | 11/1990 |
| JP | H0821240 | 1/1996 |
| JP | 100830551 | 5/2008 |
| JP | 2012171363 | 9/2012 |
| WO | WO 1994/09548 | 4/1994 |
| WO | WO 2006/074559 | 7/2006 |
| WO | WO 2009/082828 | 7/2009 |

OTHER PUBLICATIONS

Filing Receipt and Patent Application for U.S. Appl. No. 15/187,368 filed with the U.S. Patent and Trademark Office on Jun. 20, 2016; 37 pages.

First Examination Report issued by the New Zealand Intellectual Property Office, dated Aug. 11, 2017, for New Zealand Patent Application No. 712787; 5 pages.

Further Examination Report issued by the New Zealand Intellectual Property Office, dated Oct. 20, 2017, for New Zealand Patent Application No. 712787; 5 pages.

Further Examination Report issued by the New Zealand Intellectual Property Office, dated Jan. 12, 2018, for New Zealand Patent Application No. 712787; 4 pages.

Further Examination Report issued by the New Zealand Intellectual Property Office, dated Mar. 8, 2018, for New Zealand Patent Application No. 712787; 3 pages.

Further Examination Report issued by the New Zealand Intellectual Property Office, dated Apr. 19, 2018, for New Zealand Patent Application No. 712787; 3 pages.

Examination Report No. 1 issued by the Australian Intellectual Property Office, dated Jun. 5, 2018, for Australian Patent Application No. 2017204451; 3 pages.

Written Opinion of the International Preliminary Examining Authority, dated Apr. 9, 2015, for International Patent Application No. PCT/US2014/031765; 11 pages.

European Search Report issued by the European Patent Office, dated Mar. 17, 2017, for European Patent Application No. 16186696.7; 5 pages.

Corrected European Search Opinion issued by the European Patent Office, dated Jun. 2, 2017, for European Patent Application No. 16186696.7; 4 pages.

International Search Report issued by the International Searching Authority, dated Oct. 24, 2017, for International Patent Application No. PCT/US2017/046005; 7 pages.

Written Opinion of the International Searching Authority, dated Oct. 24, 2017, for International Patent Application No. PCT/US2017/046005; 7 pages.

English translation of Search Report issued by the Taiwan Intellectual Patent Office, dated Aug. 30, 2018, for Taiwan Patent Application No. 106126511; 2 pages.

English translation of Search Report issued by the Taiwan Intellectual Property Office, dated Jul. 5, 2019, Taiwanese Patent Application No. 106126511; 2 pages.

Examination Report issued by the Intellectual Property India, dated Jul. 25, 2019, for Indian Patent Application No. 8191/DELNP/2015; 7 pages.

Examination Report No. 1 issued by the Australian Government IP Australia, dated Jun. 17, 2019, for Australian Patent Application No. 2017281442; 5 pages.

(56) References Cited

OTHER PUBLICATIONS

A Highly Mobile Amphibious Vehicle, Polaris Industries Inc., Oct. 20, 2015; 7 pages.

* cited by examiner

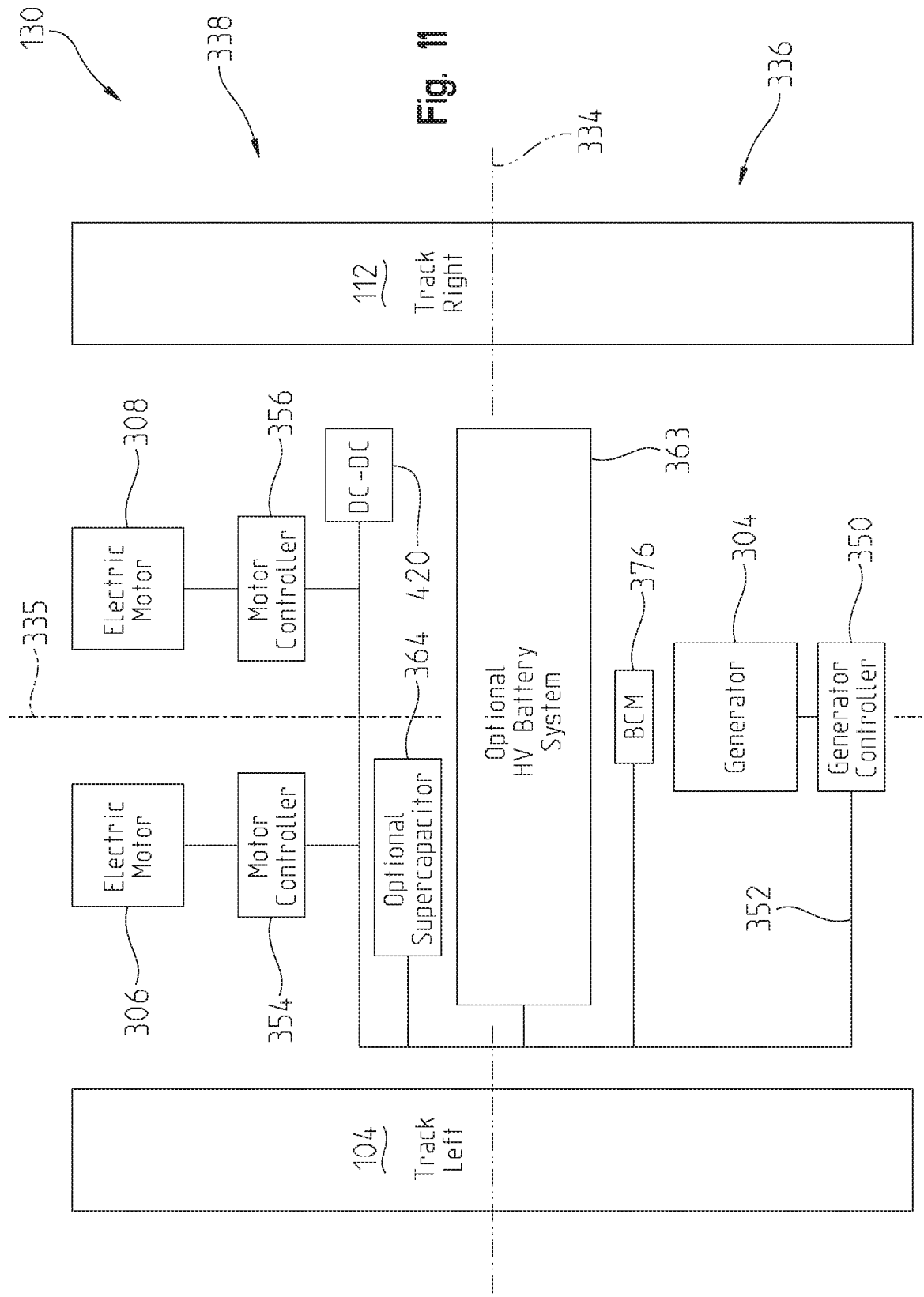

TRACKED ALL-TERRAIN VEHICLE

BACKGROUND OF THE DISCLOSURE

The present disclosure relates to vehicles, and more particularly to utility and all-terrain vehicles.

Generally, all-terrain vehicles ("ATVs") and utility vehicles ("UVs") are used to carry one or more passengers over a variety of terrain. More particularly, some ATVs and UVs may include side-by-side seating, in which a passenger may be seated next to the driver at the front of the vehicle. Side-by-side vehicles also may include a rear seating area to accommodate additional passengers in the vehicle. A roll cage may be provided over the seating of the vehicle. Additionally, ATVs and UVs may provide a cargo area in the front and/or the rear of the vehicle in order to carry cargo. ATVs and UVs include ground-engaging members, which may be tires, tracks, skis, or any other device for moving the vehicle across the ground.

Exemplary tracked ATVs are provided in U.S. patent application Ser. No. 14/225,206, filed Mar. 25, 2014 and U.S. Pat. No. 8,844,665, the entire disclosures of which are expressly incorporated by reference herein.

SUMMARY OF THE DISCLOSURE

In an exemplary embodiment of the present disclosure, a tracked all-terrain vehicle is provided. The tracked all-terrain vehicle comprising a plurality of ground engaging members including a right side endless track assembly including a right side continuous track and a left side endless track assembly including a left side continuous track having a forward most leading edge, a rearward most trailing edge; and a frame supported by the plurality of ground engaging members. The vehicle having a mid-plane located perpendicular to a longitudinal centerline plane of the tracked all-terrain vehicle and equidistant between the forward most leading edge of the left side continuous track and the rearward most trailing edge of the left side continuous track. The vehicle further comprising an internal combustion engine supported by the frame and positioned completely rearward of the mid-plane of the left side continuous track of the tracked all-terrain vehicle; a generator operatively coupled to the internal combustion engine through a first mechanical linkage, the generator being positioned completely rearward of the mid-plane of the left side continuous track of the tracked all-terrain vehicle; a first electric motor positioned completely forward of the mid-plane of the left side continuous track of the tracked all-terrain vehicle and operatively coupled to the left side endless track assembly to drive movement of the left side continuous track; and a second electric motor positioned completely forward of the mid-plane of the left side continuous track of the tracked all-terrain vehicle and operatively coupled to the right side endless track assembly to drive movement of the right side continuous track.

In another exemplary embodiment of the present disclosure, a tracked all-terrain vehicle is provided. The tracked all-terrain vehicle comprising a plurality of ground engaging members including a right side endless track assembly including a right side continuous track and a left side endless track assembly including a left side continuous track; a frame supported by the plurality of ground engaging members; a plurality of electric motors supported by the plurality of ground engaging members, the plurality of electric motors including a first electric motor operatively coupled to the left side endless track assembly to drive movement of the left side continuous track and a second electric motor operatively coupled to the right side endless track assembly to drive movement of the right side continuous track independent of the left side continuous track; at least one controller operatively coupled to the plurality of electric motors; an internal combustion engine supported by the plurality of ground engaging members and operatively coupled to the at least one controller; an electric generator driven by the internal combustion engine, the electric generator being operatively coupled to the plurality of electric motors to provide power to the plurality of electric motors; a speed monitoring device supported by the plurality of ground engaging members and operatively coupled to the at least one controller to provide an indication of a ground speed of the vehicle; a first operator input actuatable by an operator of the vehicle, the first operator input being operatively coupled to the at least one controller to provide an indication of a requested vehicle speed to the at least one controller; and a second operator input actuatable by an operator of the vehicle, the second operator input being operatively coupled to the at least one controller to provide an indication of a requested vehicle travel direction to the at least one controller. The at least one controller based on the indication of the ground speed of the vehicle, the indication of the requested vehicle speed, and the indication of the requested vehicle travel direction determines a power demand of the first electric motor and the second electric motor to achieve the requested vehicle speed and the requested vehicle direction and controls an output of the internal combustion engine based on the determined power demand of the plurality of electric motors.

In a further exemplary embodiment of the present disclosure, a tracked all-terrain vehicle is provided. The tracked all-terrain vehicle comprising a plurality of ground engaging members including a right side endless track assembly including a right side continuous track and a left side endless track assembly including a left side continuous track; a frame supported by the plurality of ground engaging members; a plurality of electric motors supported by the plurality of ground engaging members, the plurality of electric motors including a first electric motor operatively coupled to the left side endless track assembly to drive movement of the left side continuous track and a second electric motor operatively coupled to the right side endless track assembly to drive movement of the right side continuous track independent of the left side continuous track; at least one controller operatively coupled to the plurality of electric motors; a first operator input actuatable by an operator of the vehicle, the first operator input being operatively coupled to the at least one controller to provide a zero point turn request to the at least one controller; a second operator input actuatable by an operator of the vehicle, the second operator input being operatively coupled to the at least one controller to provide an indication of a requested zero point turn speed to the at least one controller; a third operator input actuatable by an operator of the vehicle, the third operator input being operatively coupled to the at least one controller to provide an indication of a requested zero point turn direction to the at least one controller. The at least one controller, in response to the zero point turn request, controls the plurality of electric motors to execute a zero point turn having the requested zero point turn speed and the requested zero point turn direction.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

FIG. 11 is representative view of a high voltage system layout of the embodiment of the vehicle of FIG. 1;

Figure 1:
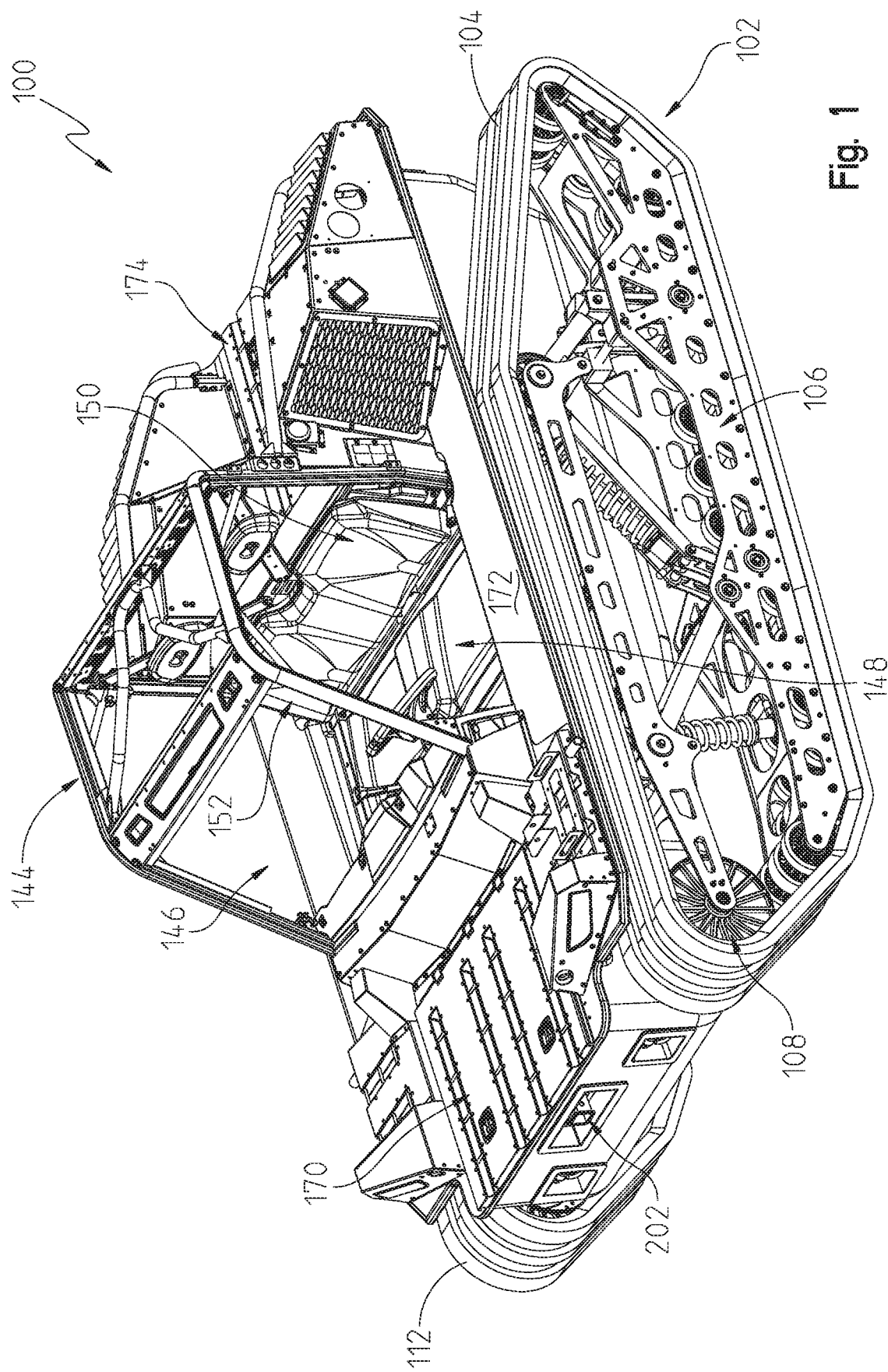
FIG. 1 is a left, front, perspective view of an illustrative vehicle of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles ("ATV"), utility vehicles ("UV"), motorcycles, watercraft, snowmobiles, side-by-side vehicle ("SxS"), and golf carts.

Figure 4:
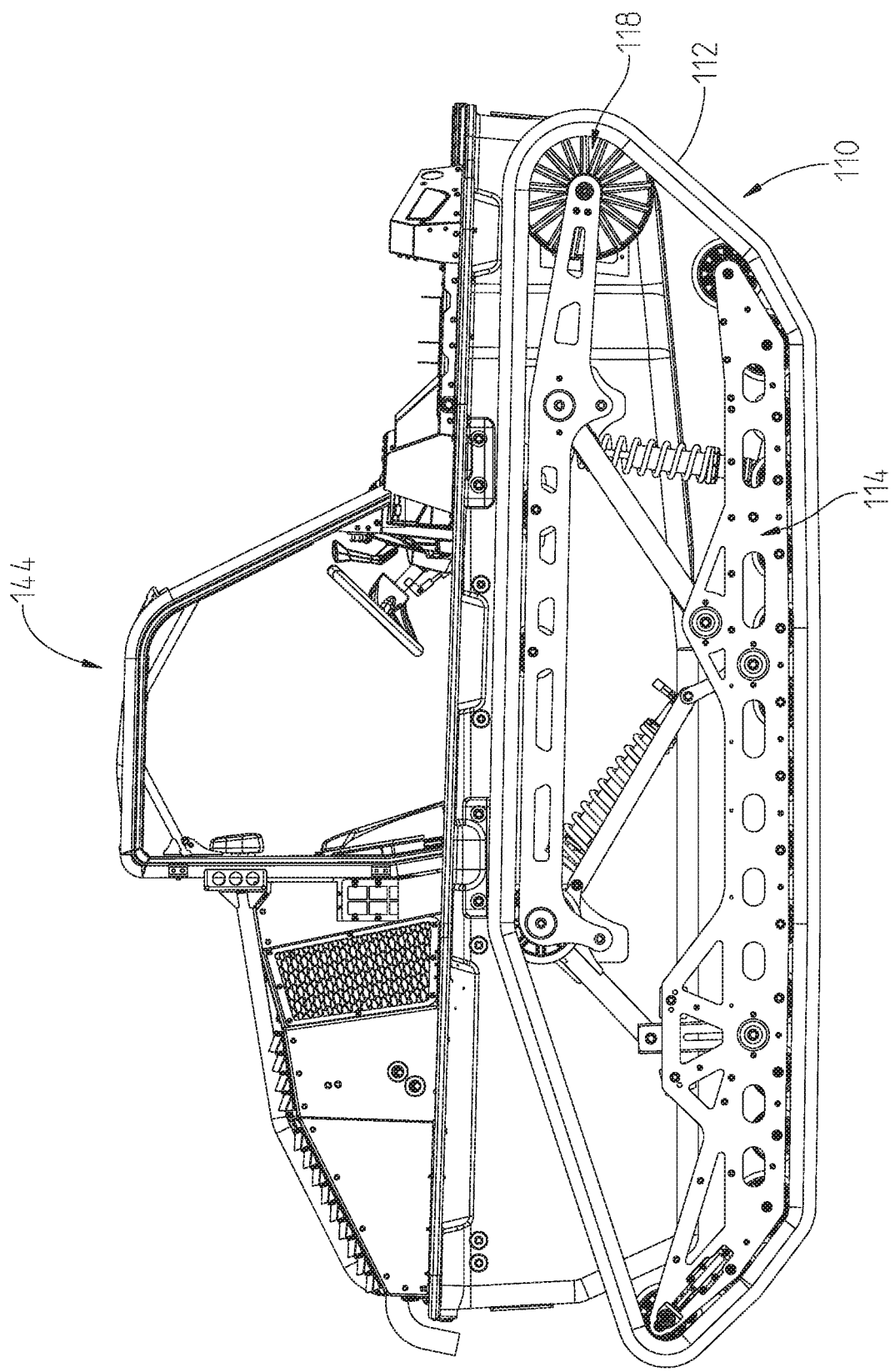
FIG. 4 is a right, side view of the embodiment of the vehicle of FIG. 1.

Referring to FIG. 1, an illustrative embodiment of a vehicle 100 is shown. As detailed further herein, vehicle 100 may be a tracked ATV that includes ground engaging members, illustratively a left side endless track assembly 102 having a left side continuous track 104 surrounding a left side suspension assembly 106 (FIG. 1) and a right side endless track assembly 110 having a right side continuous track 112 surrounding a right side suspension assembly 114 (FIG. 4). Each of left side suspension assembly 106 and right side suspension assembly 114 are coupled suspensions.

Figure 5:
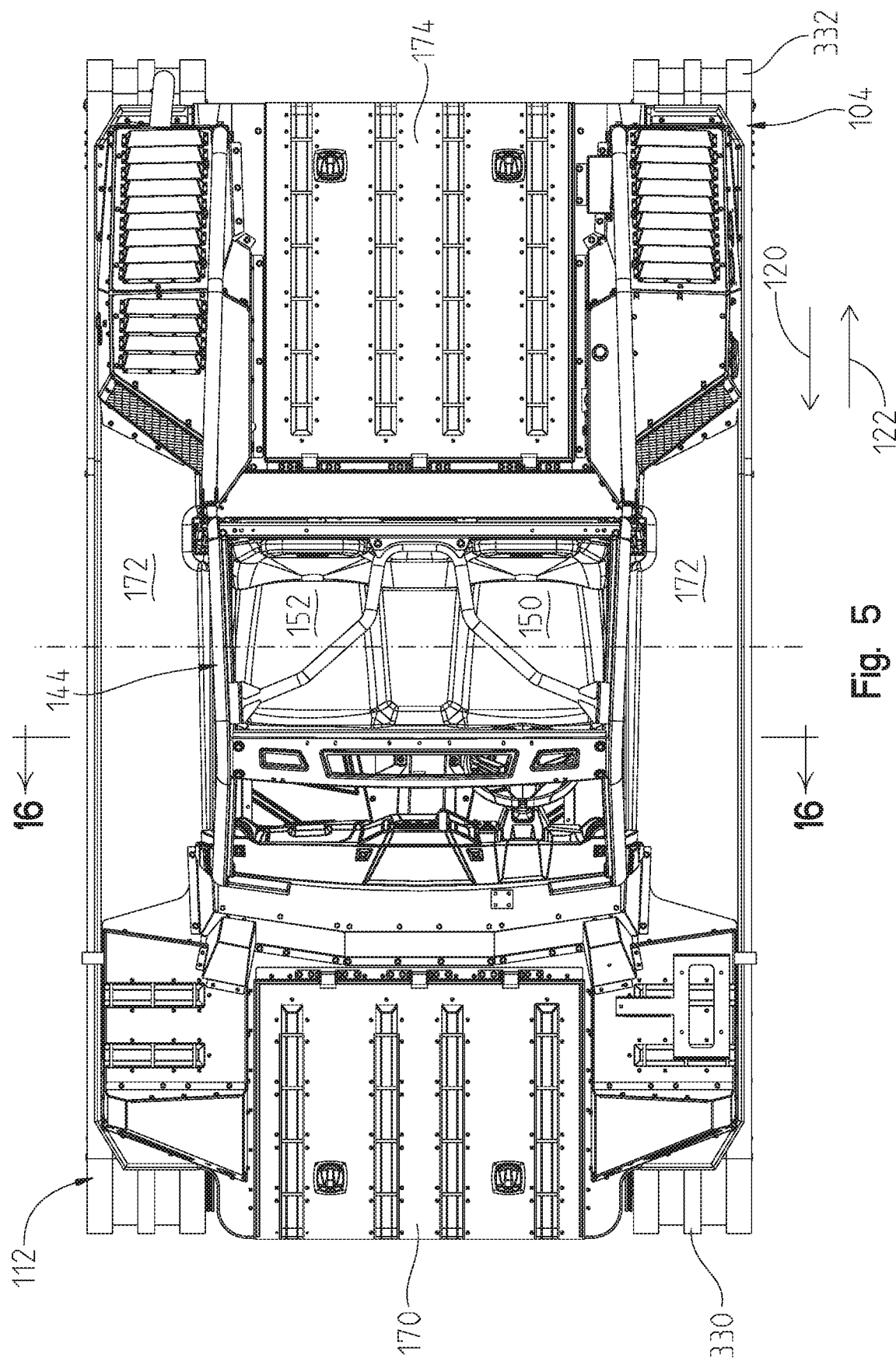
FIG. 5 is a top view of the embodiment of the vehicle of FIG. 1.

Left side continuous track 104 of left side endless track assembly 102 is engaged by a drive unit, illustratively a drive sprocket 108, and right side continuous track 112 of right side endless track assembly 110 is engaged by a drive unit, illustratively a drive sprocket 118. Through the rotation of respective drive sprocket 108 and drive sprocket 118, left side continuous track 104 and right side continuous track 112 may both be independently moved in a forward direction 120 (see FIG. 5) to also propel vehicle 100 in forward direction 120, may both be independently moved in a reverse direction 122 (see FIG. 5) to also propel vehicle 100 in reverse direction 122, or moved in opposite directions 120, 122 to execute a zero point turn. By moving both left side continuous track 104 and right side continuous track 112 in forward direction 120, but at different speeds vehicle 100 will move generally in a forward direction, but also execute a turn, the sharpness of the turn being based on the different speeds of left side continuous track 104 and right side continuous track 112.

Vehicle further includes a drive assembly 300 (FIGS. 10-15), a frame assembly 140 (FIGS. 8 and 9), a body or tub 142 (FIGS. 8 and 9), and a roll cage assembly 144. Roll cage assembly 144 covers an operator area 146 including seating 148 having an operator seating area 150 and a passenger seating area 152. In the illustrated embodiment, seating 148 includes a seat back and a seat bottom. As shown, seating 148 is configured as a bench seat and the seat backs are configured as a single back rest. Alternatively, the seats may be separate from each other and be bucket seats. Referring to FIG. 16, the operator area 146 further includes a plurality of operator controls 160.

Figure 3:
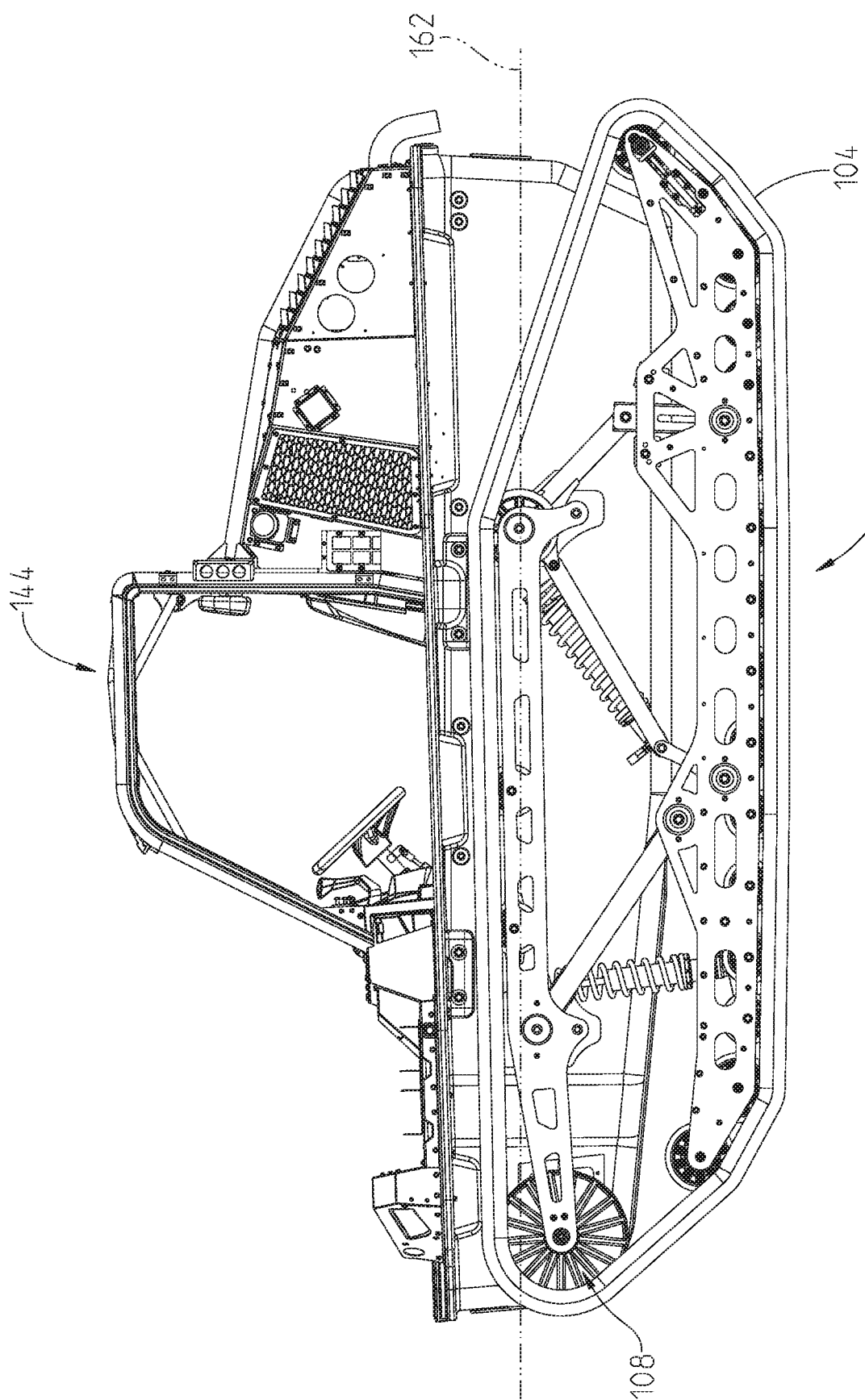
FIG. 3 is a left, side view of the embodiment of the vehicle of FIG. 1.

Vehicle 100 may be configured for military applications and is configured to travel through various terrains or surfaces. More particularly, vehicle 100 is configured for both land and amphibious operation. In the case of amphibious operation, the waterline of the vehicle with a capacity load would be represented by line 162, as best shown in FIG. 3. Additionally, vehicle 100 may be autonomous and operated by remote control, as disclosed in U.S. patent application Ser. No. 14/968,487 filed Dec. 14, 2015, the entire disclosure of which is expressly incorporated by reference herein. In one embodiment, vehicle 100 may be configured to travel at speeds of approximately 50 mph during land operation.

Figure 6:
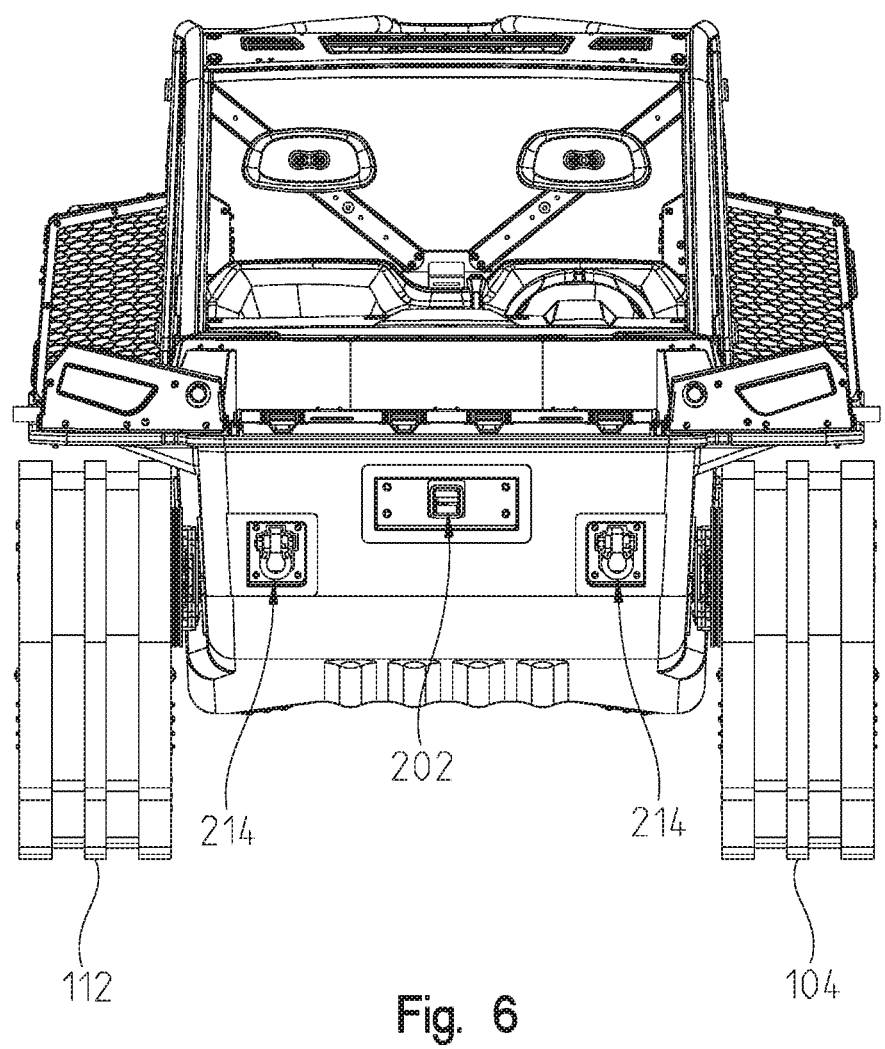
FIG. 6 is a front view of the vehicle of FIG. 1.
Figure 7:
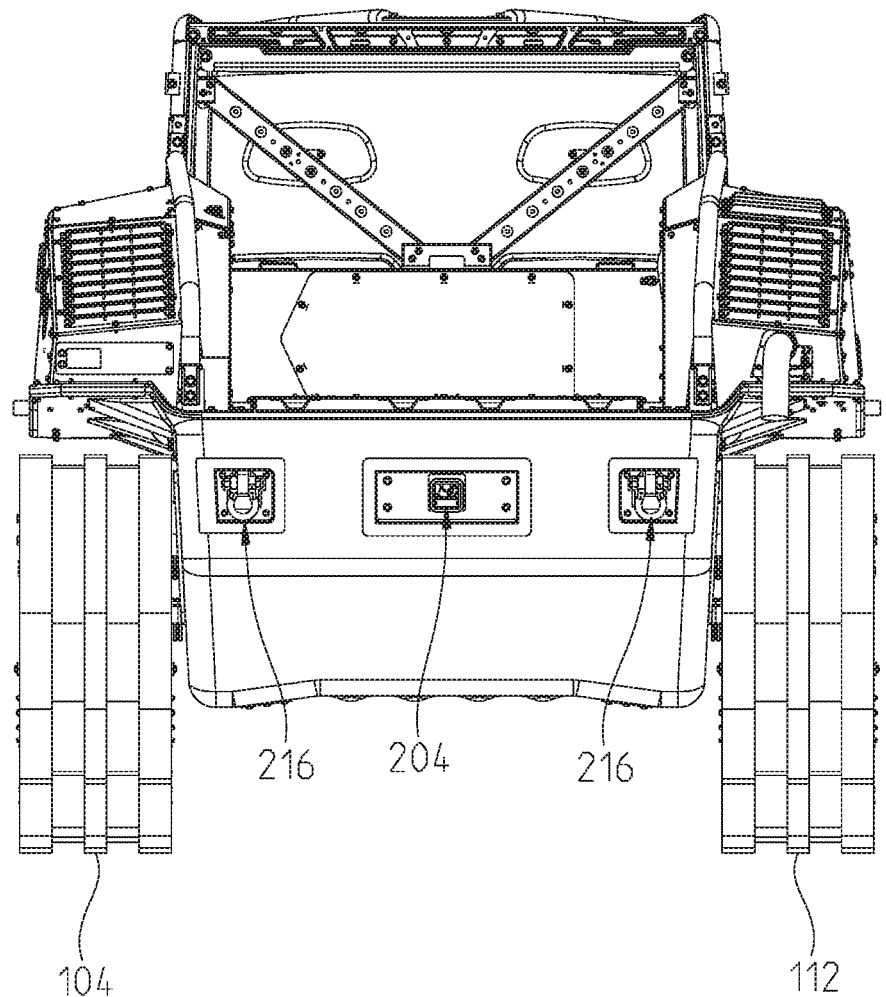
FIG. 7 is a rear view of the vehicle of FIG. 1.

As shown in FIGS. 1, 6, and 7, frame assembly 140 and tub 142 are supported by left side endless track assembly 102 and right side endless track assembly 110. In one embodiment, left side continuous track 104 of left side endless track assembly 102 and right side continuous track 112 of right side endless track assembly 110 may be comprised of a polymeric material (e.g., rubber) and may be approximately 12 inches in width (approximately 0.3 m).

Frame assembly 140 also may support a plurality of body members or panels, for example a hood 170, tub 142 which has side fenders 172 and a rear deck 174. Side fenders 172 are laterally outward of operator area 146 and may be provided as support structure for ingress and egress with vehicle 100. Hood 170 may support a front cargo area forward of operator area 146, as discussed in more detail in U.S. patent application Ser. No. 15/187,368, filed Jun. 20, 2016, docket PLR-09-25966.04P-US, the entire disclosure of which is expressly incorporated by reference herein. As shown, rear deck 174 is a fixed cargo area. Alternatively, rear deck 174 may be a movable dump box configured to pivot upwardly and rearwardly for unloading cargo therefrom. In one embodiment, the base weight of vehicle 100 may be approximately 1750 lb (approximately 794 kg) and vehicle 100 may be configured to accommodate approximately 500 lbs (approximately 227 kg) of cargo. Vehicle 100 may be configured with features for distributing the weight of any cargo supported on vehicle 100 during land operation and amphibious operation. For example, the cargo weight may be distributed such that the combined center of gravity of vehicle 100 and the cargo is positioned approximately at a center point of vehicle 100 along mid plane 334 (see FIG. 15) and the centerline longitudinal plane 335 (see FIG. 15). As such, vehicle 100 may not bias forwardly or rearwardly in the water during amphibious operation. Vehicle 100 may include a load level notification system to alert the operator of payload distribution, as discussed in more detail in U.S. patent application Ser. No. 15/187,368, filed Jun. 20, 2016, docket PLR-09-25966.04P-US, the entire disclosure of which is expressly incorporated by reference herein.

Figure 8:
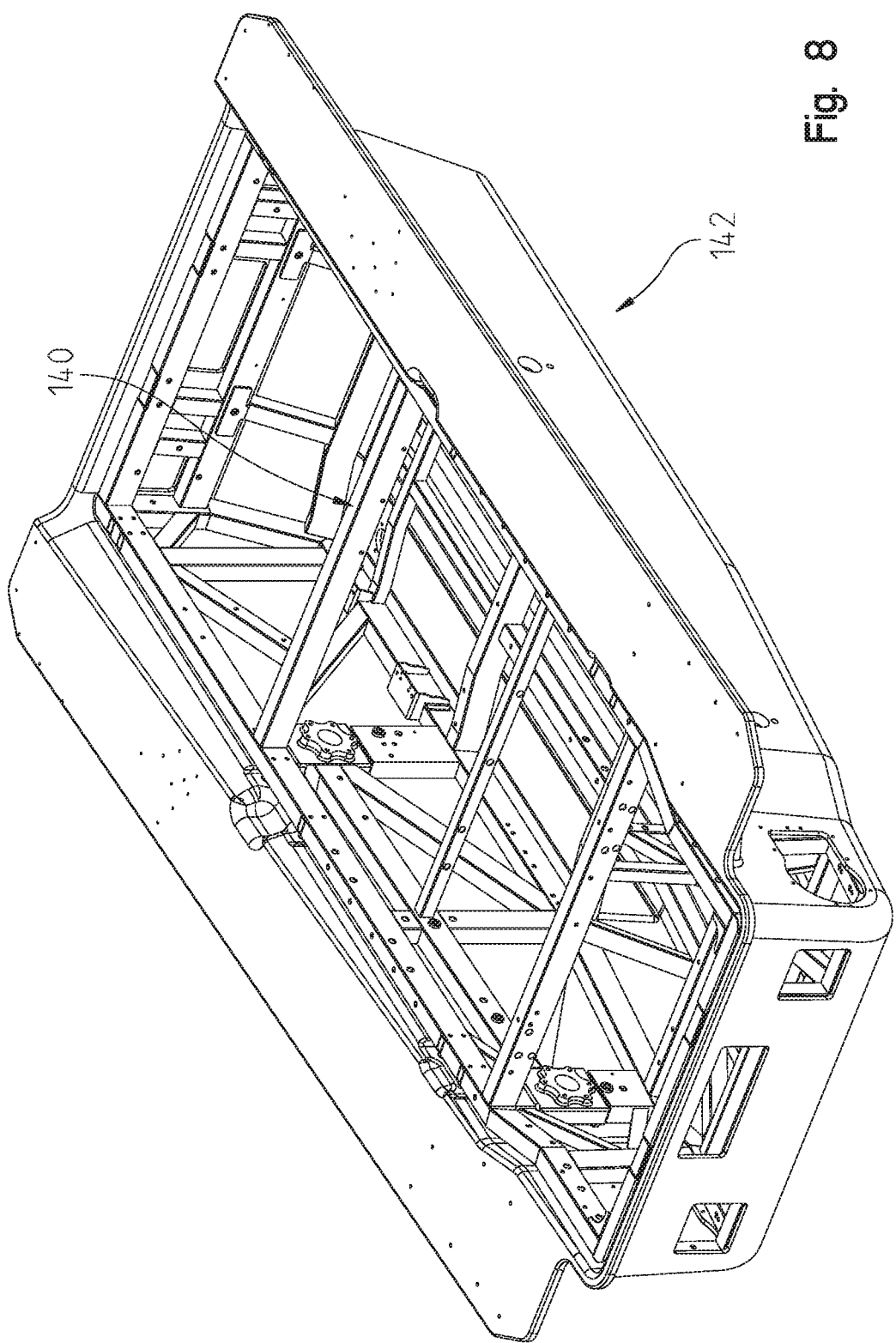
FIG. 8 is a left, front, perspective view of a frame assembly and a tub of the vehicle of FIG. 1.
Figure 9:
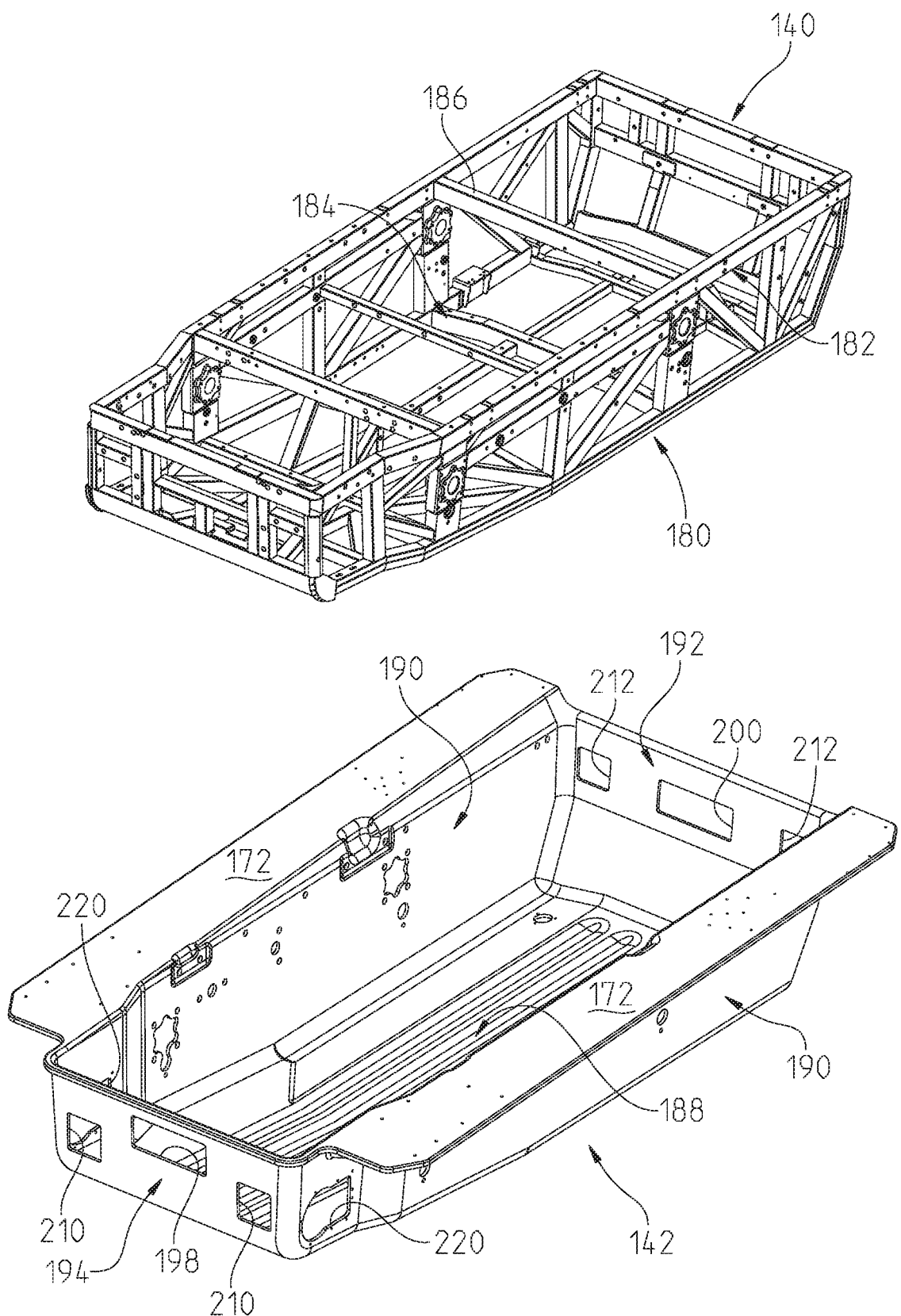
FIG. 9 is an exploded view of the frame assembly and the tub of FIG. 8.

Referring now to FIGS. 8 and 9, frame assembly 140 includes a plurality of lower longitudinal frame members 180, a plurality of upper longitudinal frame members 182, a plurality of upper cross members 184 and a plurality of lower cross members 186. Illustrative frame assembly 140 includes at least two lower longitudinal frame members 180, at least two upper longitudinal frame members 182, four upper cross members 184 and four lower cross members 186; however, frame assembly 140 may include varying quantities and arrangements of longitudinal frame members 180, 182 and cross members 184, 186. As shown, other braces are shown for rigidifying the frame and other brackets are provided for such means as mounting the engine and seats.

Illustratively, upper longitudinal frame members 182 are supported at a top surface of tub 142 and may be coupled together and coupled to tub 142 with conventional fasteners, such as structural bonds, welds, rivets, bolts, and adhesive. Lower longitudinal frame members 180 and cross members 186 are supported on a bottom wall 188 of tub 142. Lower longitudinal frame members 180 and cross members 186 may be coupled together and coupled to tub 142 with conventional fasteners, such as structural bonds, welds, rivets, bolts, and adhesive. In one embodiment, the longitudinal length of frame assembly 140 and tub 142 may be approximately 11.5 ft. (approximately 3.5 m) and the width of frame assembly 140 and tub 142 may be approximately 6.5 ft. (approximately 2.5 m).

Longitudinal frame members 180, 182 and cross frame members 184, 186 may be comprised of a metallic or polymeric material. Frame assembly 140 of FIGS. 8 and 9 may be comprised of an aluminum material, for example 6061-T6 Aluminum. Similarly, tub 142 may be comprised of an aluminum material, for example 5052-H32 Aluminum. Alternatively, at least a portion of frame assembly 140 and/or tub 142 may include ultra-high molecular weight polyethylene. Additionally, frame assembly 140 and/or tub 142 may include a marine-grade pourable urethane coating and/or foam material inserts in order to fill volume voids and resist water ingestion during amphibious operation. As such, frame assembly 140 and tub 142 are configured to minimize water accumulation within vehicle 100. Flotation devices, such as inflatable units, may also be included and secured to vehicle 100 to further increase the buoyancy of vehicle 100 during amphibious operation. In one embodiment, vehicle 100 is configured to float at approximately 1,600 kg without any urethane materials; however, urethane materials may increase the buoyancy of vehicle 100 during amphibious operation.

Figure 2:
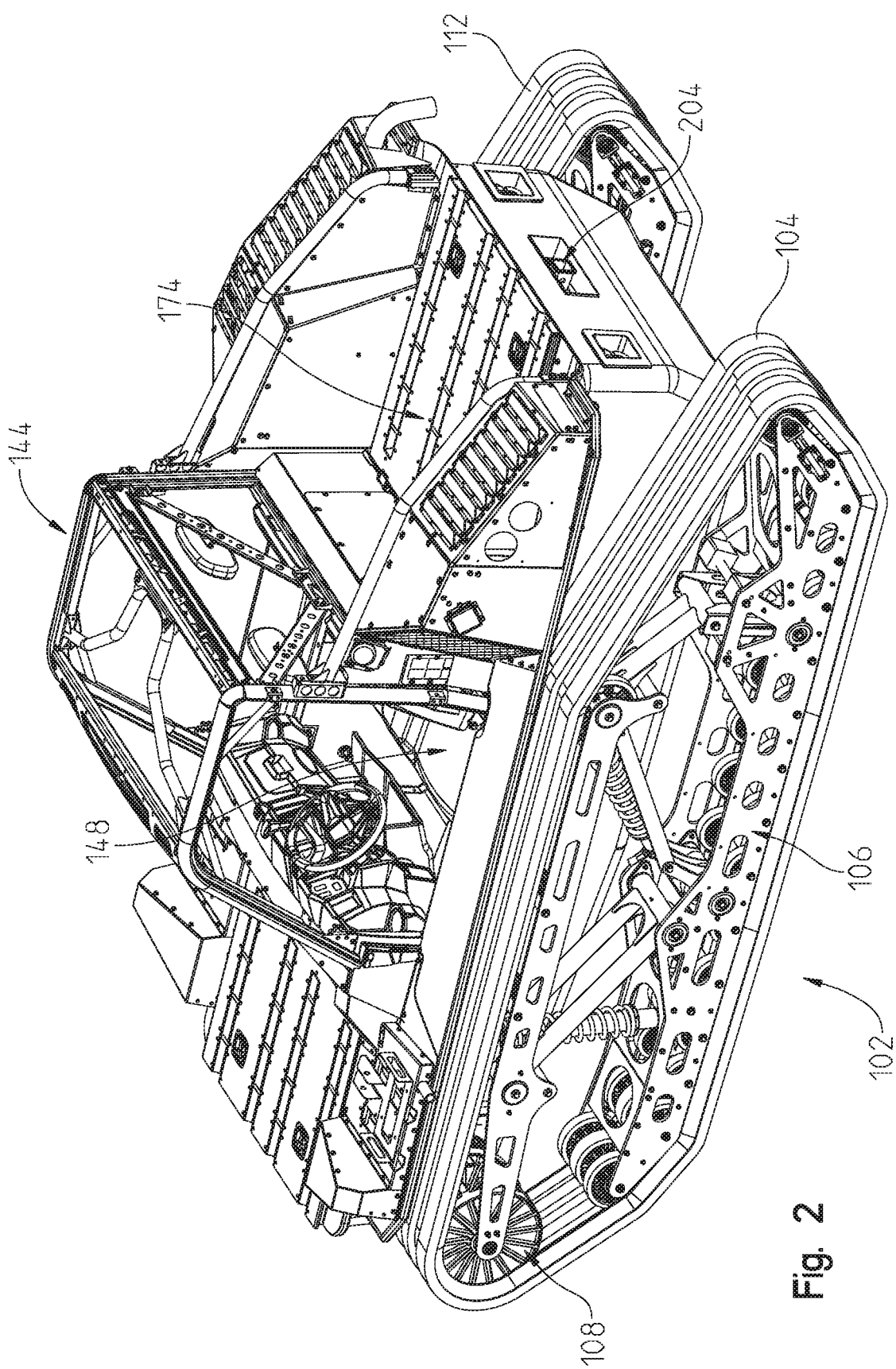
FIG. 2 is a left, rear, perspective view of the embodiment of the vehicle of FIG. 1.

Referring still to FIGS. 8 and 9, tub 142 includes side walls 190, a rear wall 192, front wall 194, and bottom wall 188. Sidewalls 190 support fenders 172. Rear and front walls 192, 194 may include openings 198, 200 to receive tow bars 202, 204 (FIGS. 1 and 2) and openings 210, 212 to receive latches 214, 216 (FIGS. 6 and 7) which provides vehicle 100 with towing capabilities. Additional tie-downs, latches, hooks, or other members may be provided for attaching additional cargo or assisting with towing capacity. Vehicle 100 may have a towing capacity of approximately 500-1000 lbs. (approximately 227-450 kg). Side walls 190 of tub 142 include a plurality of openings. For example, side walls 190 include a plurality of axle openings 220 adjacent front wall 194.

Figure 10:
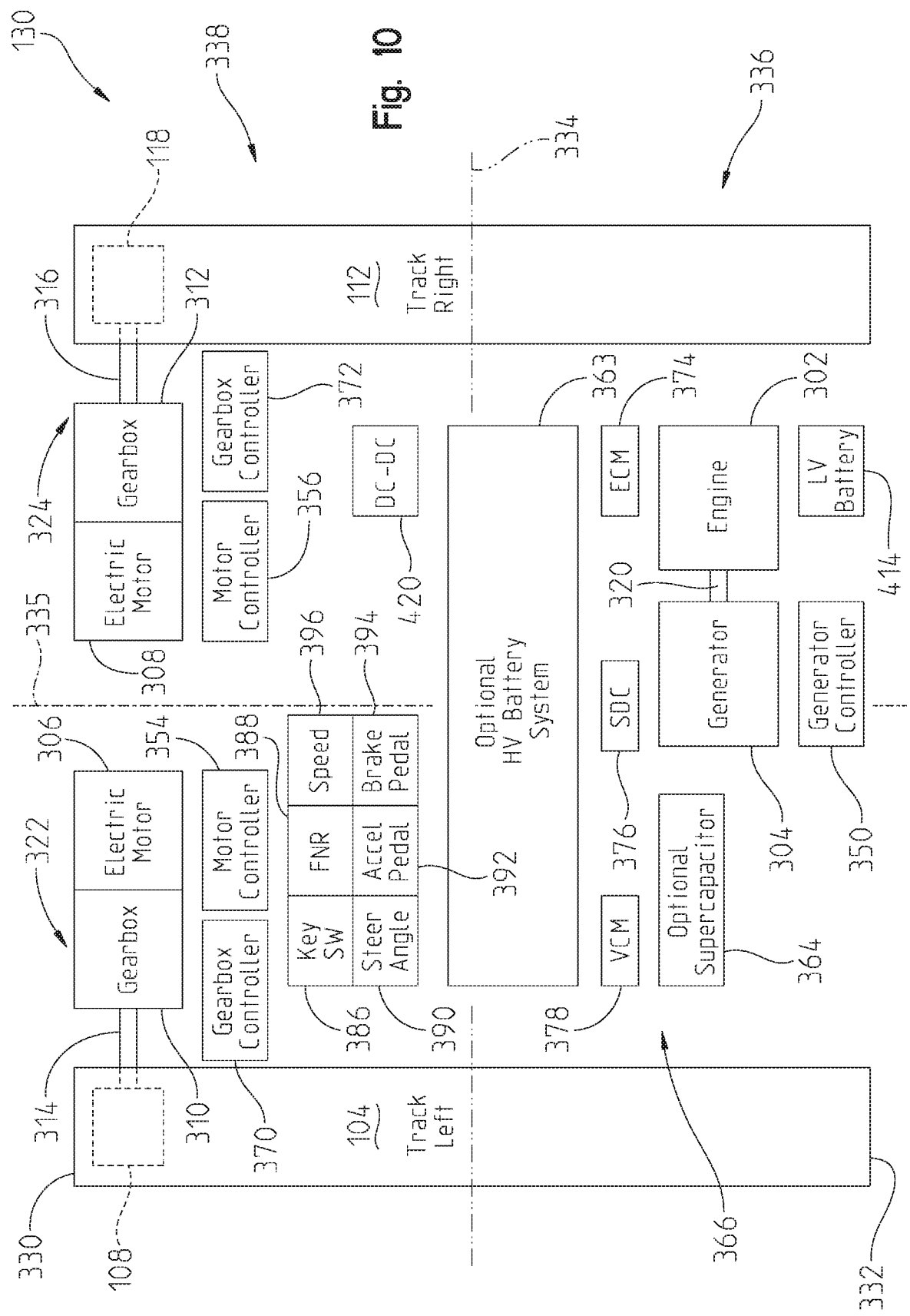
FIG. 10 is representative view of a mechanical system layout of the embodiment of the vehicle of FIG. 1.
Figure 12:
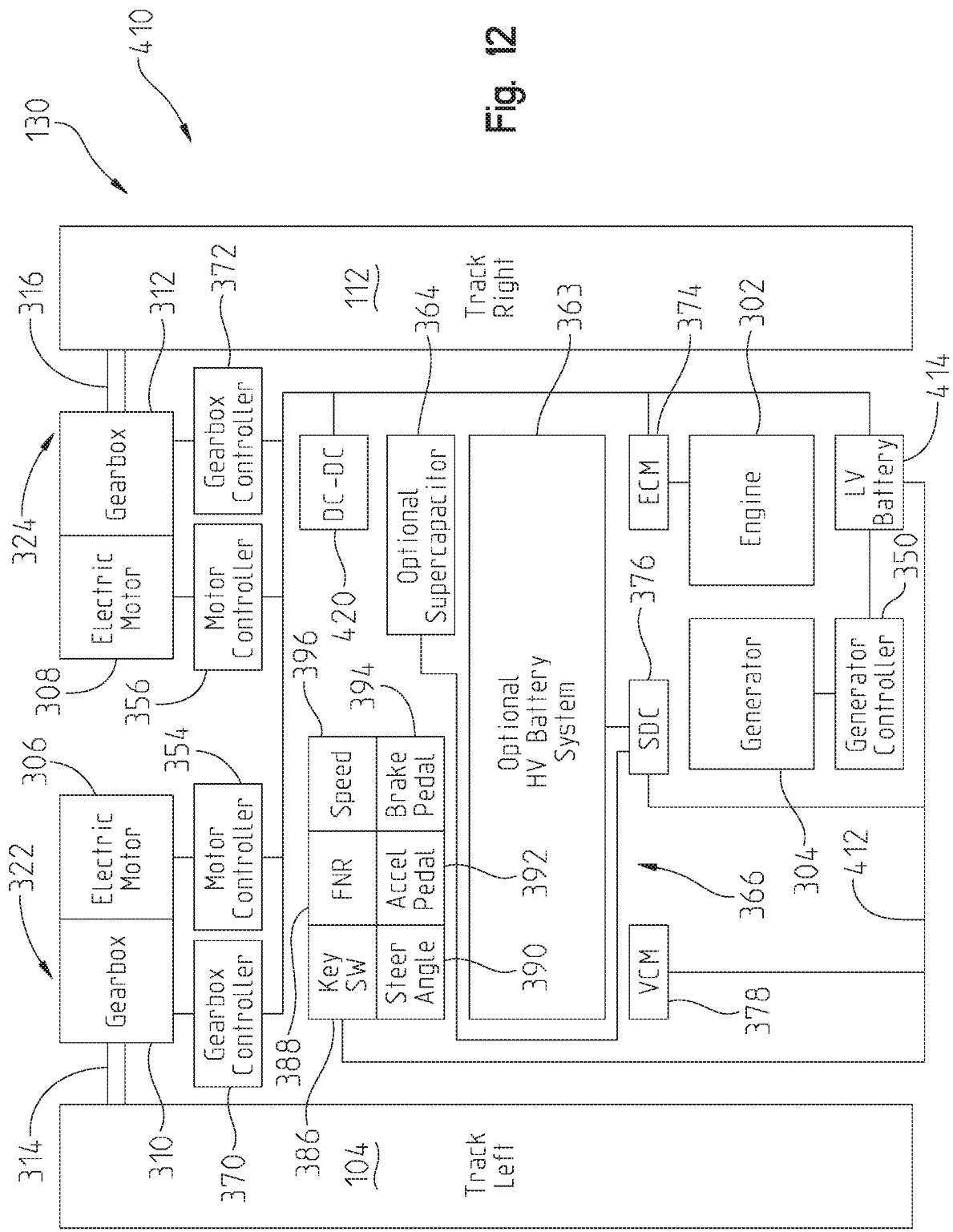
FIG. 12 is representative view of a low voltage system layout of the embodiment of the vehicle of FIG. 1.

Referring to FIGS. 10-12, drive assembly 300 of vehicle 100 is supported by left side endless track assembly 102 and right side endless track assembly 110 for driving left side continuous track 104 and right side continuous track 112 of vehicle 100. FIG. 10 illustrates an exemplary layout of components of drive assembly 300. FIG. 11 illustrates exemplary high voltage electrical connections of drive assembly 300. FIG. 12 illustrates exemplary low voltage electrical connections of drive assembly 300.

Referring to FIG. 10, drive assembly 300 includes an internal combustion engine 302, an electrical generator 304, a left side electric motor 306, a right side electric motor 308, a left side gearbox 310, a right side gearbox 312, a left side drive shaft 314, and a right side drive shaft 316. Electrical generator 304 is mechanically coupled to internal combustion engine 302 through a first mechanical linkage 320. Exemplary mechanical linkages includes fasteners to couple an input shaft of electrical generator 304 to a crankshaft of internal combustion engine 302, a drive shaft coupling an input shaft of electrical generator 304 to a crankshaft of internal combustion engine 302, a belt and pulley system coupling an input shaft of electrical generator 304 to a crankshaft of internal combustion engine 302, and other suitable mechanical means of transferring power from internal combustion engine 302 to electrical generator 304.

Electric motors 306, 308 are mechanically coupled to drive sprocket 108 and drive sprocket 118, respectively, through a second mechanical linkage 322 and a third mechanical linkage 324. Illustratively, second mechanical linkage 322 includes left side gearbox 310 and left side drive shaft 314 which extends through axle openings 220 of tub 142 and is coupled to a shaft of drive sprocket 108 and third mechanical linkage 324 includes right side gearbox 312 and right side drive shaft 316 which extends through axle openings 220 of tub 142 and is coupled to a shaft of drive sprocket 118.

As shown in FIG. 10, left side continuous track 104 has a forward most leading edge 330 and a rearward most trailing edge 332. A mid-plane 334 is located perpendicular to a longitudinal centerline plane 335 of vehicle 100. Mid-plane 334 is further positioned equidistant between leading edge 330 of left side continuous track 104 and trailing edge 332 of left side continuous track 104. First mechanical linkage 320 is completely positioned on a first side 336 of mid-plane 334 which is rearward of mid-plane 334. Second mechanical linkage 322 and third mechanical linkage 324 are both completely positioned on a second side 338 of mid-plane 334 which is forward of mid-plane 334. In the illustrated embodiment, no mechanical linkage communicating power from the crankshaft of internal combustion engine 302 to either of drive sprocket 108 or drive sprocket 118 crosses from first side 338 of mid-plane 334 to second side 338 of mid-plane 334.

Rather, electrical power is communicated from electrical generator 304 through a generator controller 350, over a high voltage bus 352, to electric motors 306, 308 through respective motor controllers 354, 356, as shown in FIG. 11. High voltage bus 352 crosses from first side 338 of mid-plane 334 to second side 338 of mid-plane 334.

Figure 13:
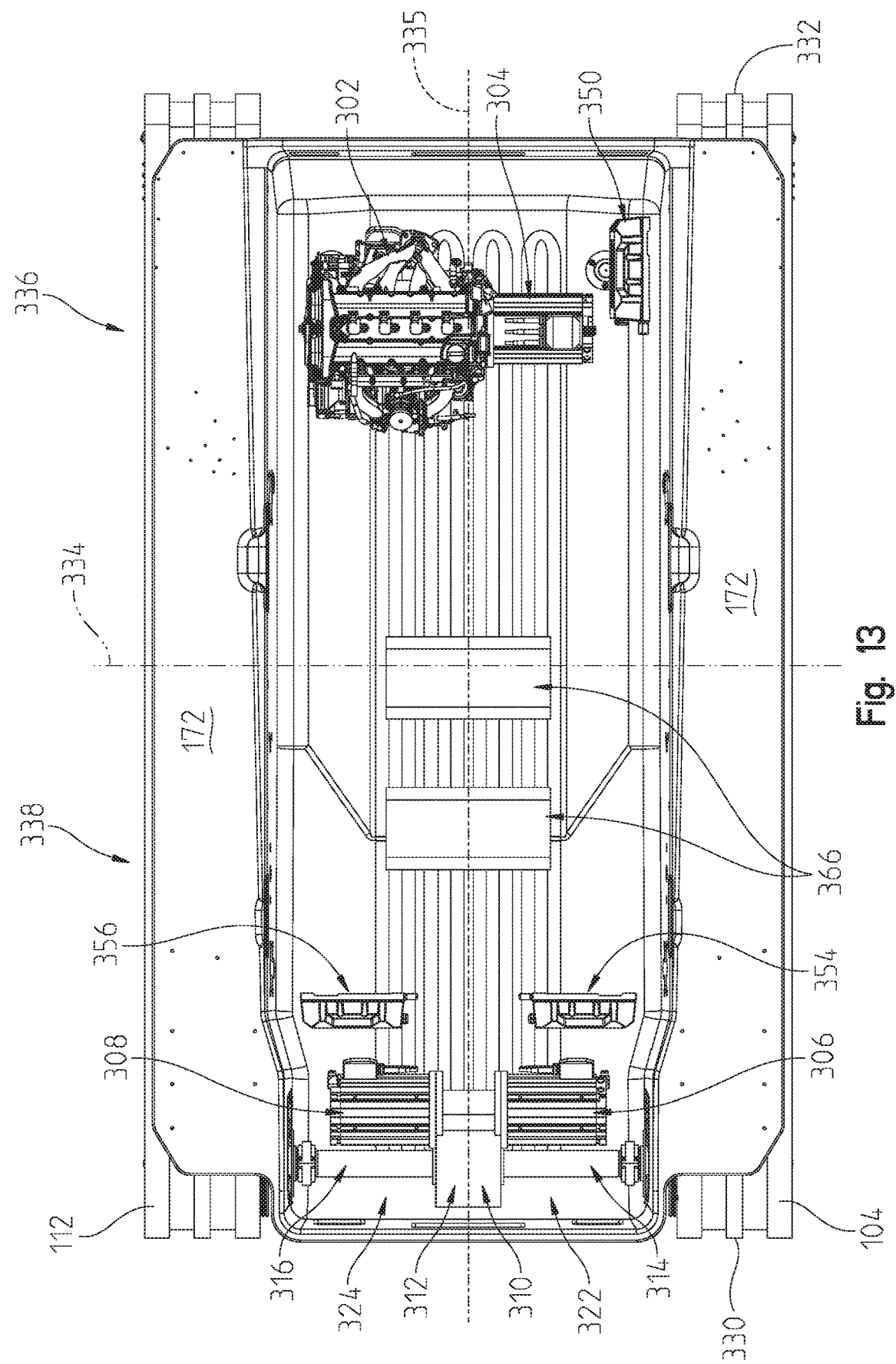
FIG. 13 is a top view of a portion of the embodiment of the vehicle of FIG. 1 including an internal combustion engine and an electrical generator secured to a crankshaft of the internal combustion engine.
Figure 14:
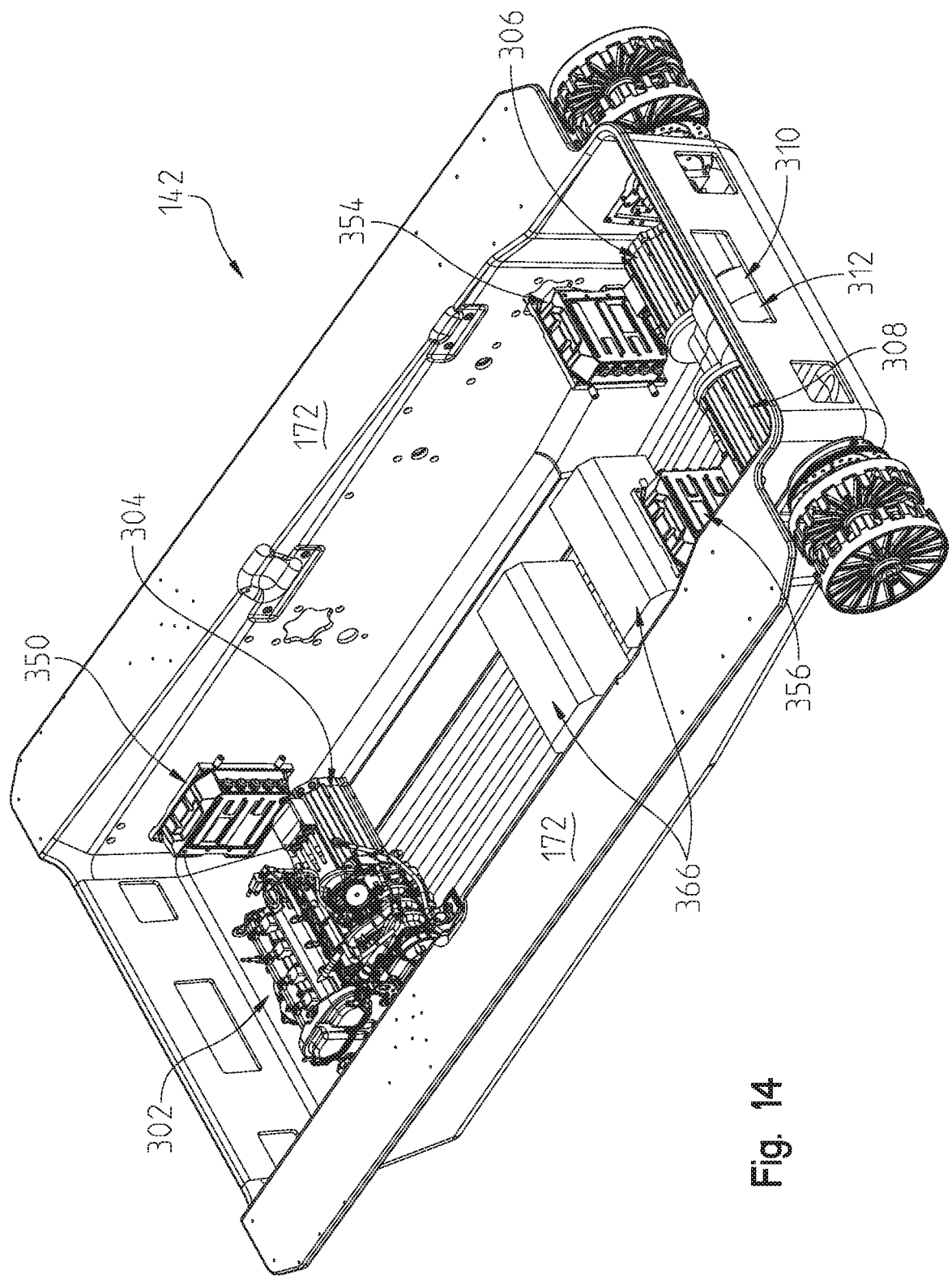
FIG. 14 is a front, right, perspective view of the arrangement of FIG. 13.

Referring to FIGS. 13 and 14 an exemplary placement of internal combustion engine 302, electrical generator 304, generator controller 350, right side electric motor 308, motor controller 356, right side gearbox 312, right side drive shaft 316, left side electric motor 306, motor controller 354, left side gearbox 310, and left side drive shaft 314 is shown. In the arrangement shown, internal combustion engine 302, electrical generator 304, and generator controller 350 are positioned in tub 142 and on first side 338 of mid-plane 334 while right side electric motor 308, motor controller 356, right side gearbox 312, right side drive shaft 316, left side electric motor 306, motor controller 354, left side gearbox 310, and left side drive shaft 314 are also positioned in tub 142 and on second side 338 of mid-plane 334. An input shaft 360 (shown in FIG. 15 in alternate embodiment) of electrical generator 304 is in line with and coupled to crankshaft 358 (shown in FIG. 15 in alternate embodiment) of internal combustion engine 302. In one embodiment, the placement of internal combustion engine 302, electrical generator 304, generator controller 350, right side electric motor 308, motor controller 356, right side gearbox 312, right side drive shaft 316, left side electric motor 306, motor controller 354, left side gearbox 310, and left side drive shaft 314 is selected to balance the load front to back on vehicle 100 so that vehicle 100 floats evenly in water.

Further, the placement of internal combustion engine 302, electrical generator 304, generator controller 350, right side electric motor 308, motor controller 356, right side gearbox 312, right side drive shaft 316, left side electric motor 306, motor controller 354, left side gearbox 310, and left side drive shaft 314 is selected to concentrate mass towards the front and rear ends of vehicle 100. Such concentration provides improved characteristics of vehicle 100 when airborne during ground transportation over rough terrain. Each of internal combustion engine 302, electrical generator 304, generator controller 350, right side electric motor 308, motor controller 356, right side gearbox 312, right side drive shaft 316, left side electric motor 306, motor controller 354, left side gearbox 310, and left side drive shaft 314 may be secured to one or more of frame assembly 140 and tub 142.

Figure 15:
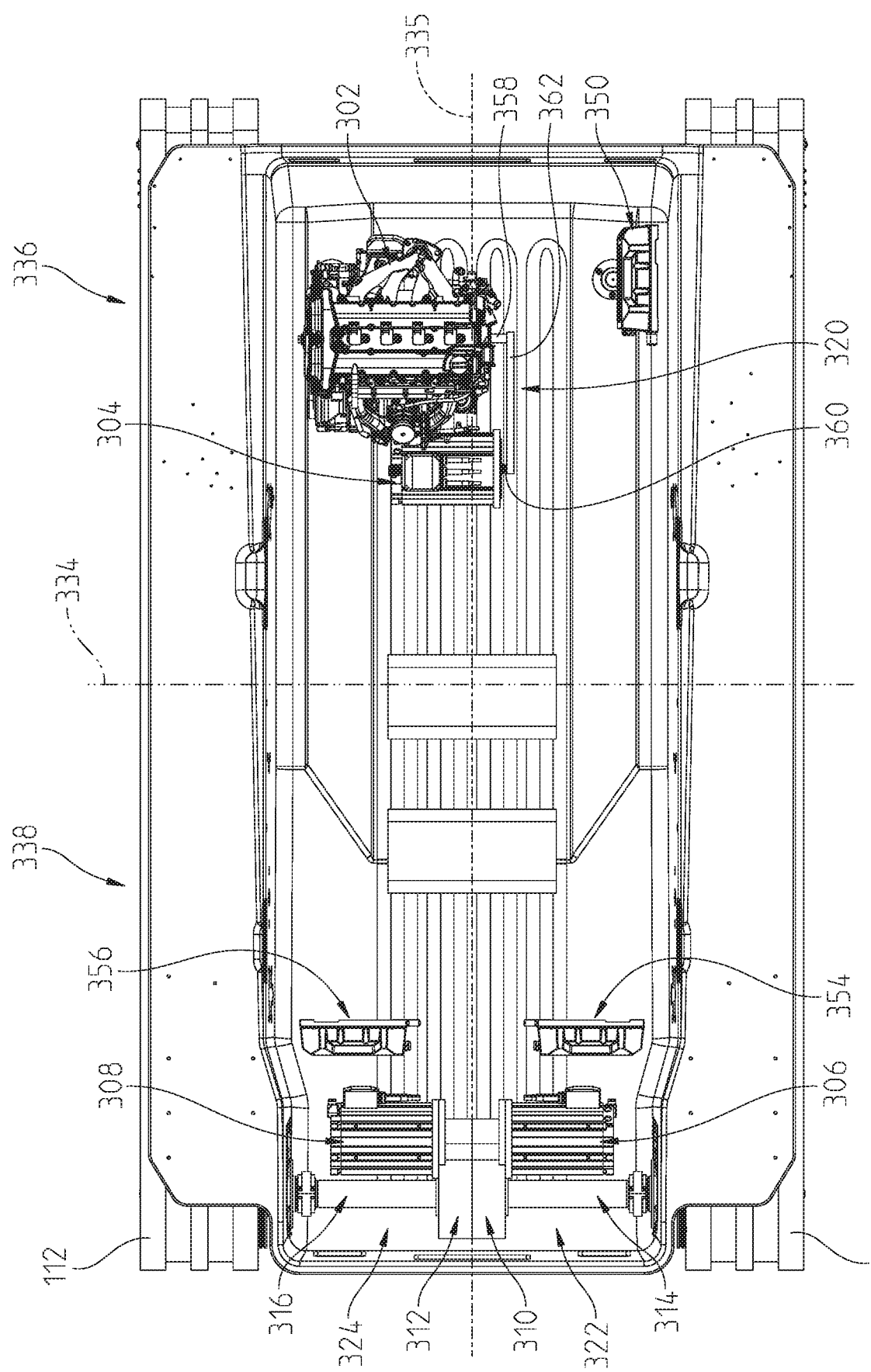
FIG. 15 is a top view of a portion of the embodiment of the vehicle of FIG. 1 including an internal combustion engine and an electrical generator offset from a crankshaft of the internal combustion engine.
Figure 16:
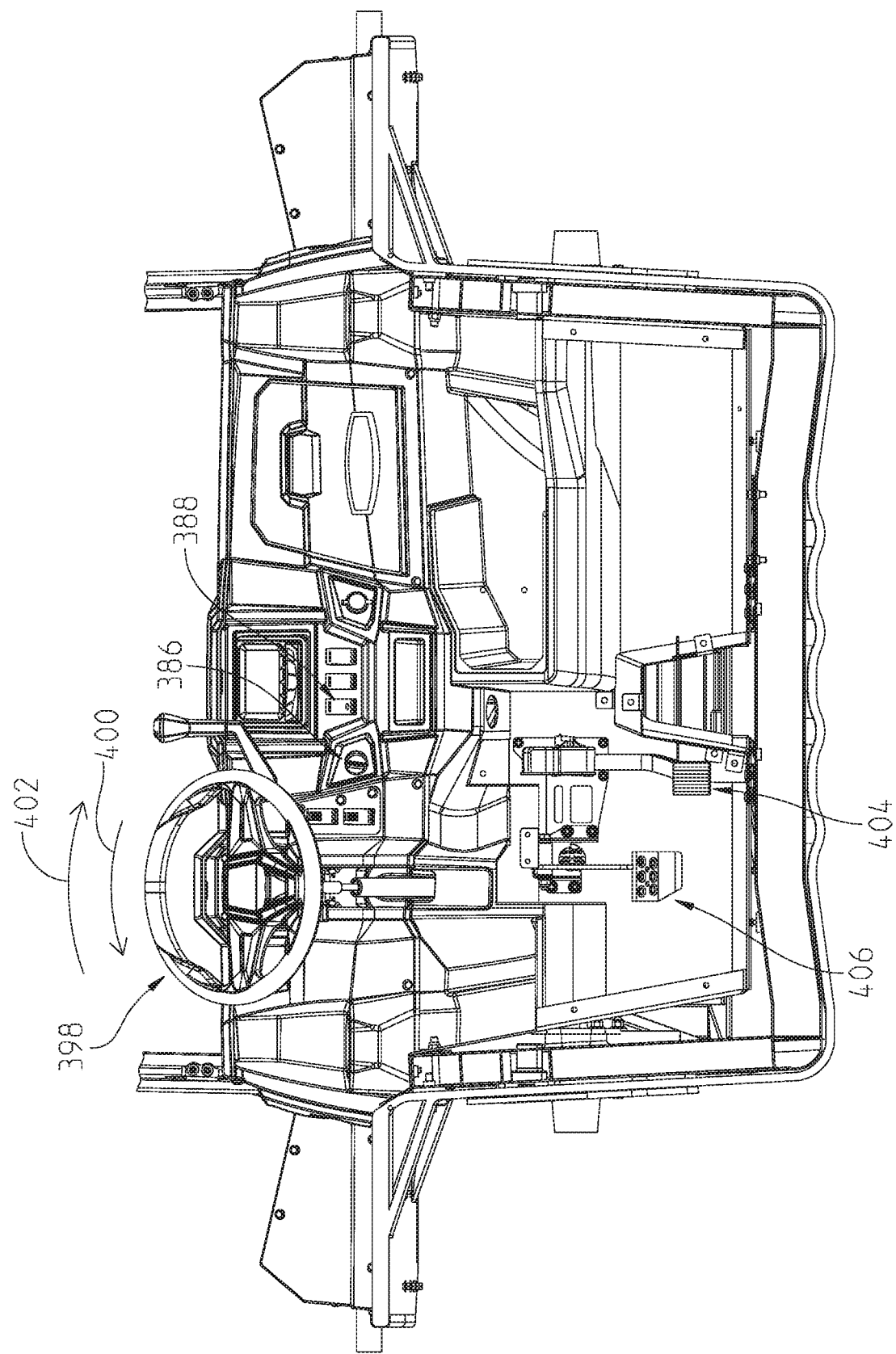
FIG. 16 is a partial forward facing view generally along lines 16-16 in FIG. 5 illustrating exemplary operator controls in an operator area of the embodiment of the vehicle of FIG. 1.

Referring to FIG. 15, an alternative arrangement of internal combustion engine 302, electrical generator 304, generator controller 350, right side electric motor 308, motor controller 356, right side gearbox 312, right side drive shaft 316, left side electric motor 306, motor controller 354, left side gearbox 310, and left side drive shaft 314 is shown. In the arrangement shown, internal combustion engine 302, electrical generator 304, and generator controller 350 are positioned in tub 142 and on first side 338 of mid-plane 334 while right side electric motor 308, motor controller 356, right side gearbox 312, right side drive shaft 316, left side electric motor 306, motor controller 354, left side gearbox 310, and left side drive shaft 314 are also positioned in tub 142 and on second side 338 of mid-plane 334. Input shaft 360 of electrical generator 304 is coupled to crankshaft 358 of internal combustion engine 302 through a belt and pulley system 362. Each of internal combustion engine 302, electrical generator 304, generator controller 350, right side electric motor 308, motor controller 356, right side gearbox 312, right side drive shaft 316, left side electric motor 306, motor controller 354, left side gearbox 310, and left side drive shaft 314 may be secured to one or more of frame assembly 140 and tub 142.

The positioning of internal combustion engine 302, electrical generator 304, generator controller 350, right side electric motor 308, motor controller 356, right side gearbox 312, right side drive shaft 316, left side electric motor 306, motor controller 354, left side gearbox 310, and left side drive shaft 314 in FIGS. 13-15 may be altered. Additional freedom is provided for the placement due to internal combustion engine 302 not being mechanically coupled to drive sprocket 108 and drive sprocket 118 to power movement of vehicle 100, but rather being electrically coupled to drive sprocket 108 and drive sprocket 118 through electrical generator 304. In one embodiment, left side gearbox 310 and right side gearbox 312 are oriented vertically resulting in left side electric motor 306 and right side electric motor 308 being positioned directly over left side drive shaft 314 and right side drive shaft 316.

Returning to FIG. 10, vehicle 100, in one embodiment may include one or more storage devices 366 which store electrical energy to power left side electric motor 306 and right side electric motor 308. Exemplary storage devices include batteries 363 and supercapacitors 364. Exemplary batteries include lead acid batteries, lithium ion batteries, nickel metal hydride batteries, and other suitable battery types. Referring to FIGS. 13 and 14, an exemplary placement of batteries 363 is shown in the middle of tub 142. Exemplary supercapacitors include electrostatic double layer capacitors, electrochemical pseudocapacitors, and hybrid capacitors.

The inclusion of storage devices 366 permit vehicle 100 to store excess power produced by electrical generator 304 for later use, provide a silent mode of operation wherein left side electric motor 306 and right side electric motor 308 are powered by energy solely from the storage devices and not internal combustion engine 302, incorporate regenerative braking in vehicle 100 to harvest energy during deceleration of vehicle 100, extend the range of vehicle 100 due to the ability to power left side electric motor 306 and right side electric motor 308 from one or both of internal combustion engine 302 and storage devices 366. Further, the inclusion of storage devices 366 increases the performance characteristics of vehicle 100. For example, storage devices 366 may provide a boost of power at initial acceleration or launch of vehicle 100 and may reduce the lag between an operator's request for acceleration and actual acceleration of vehicle 100.

Figure 10A:
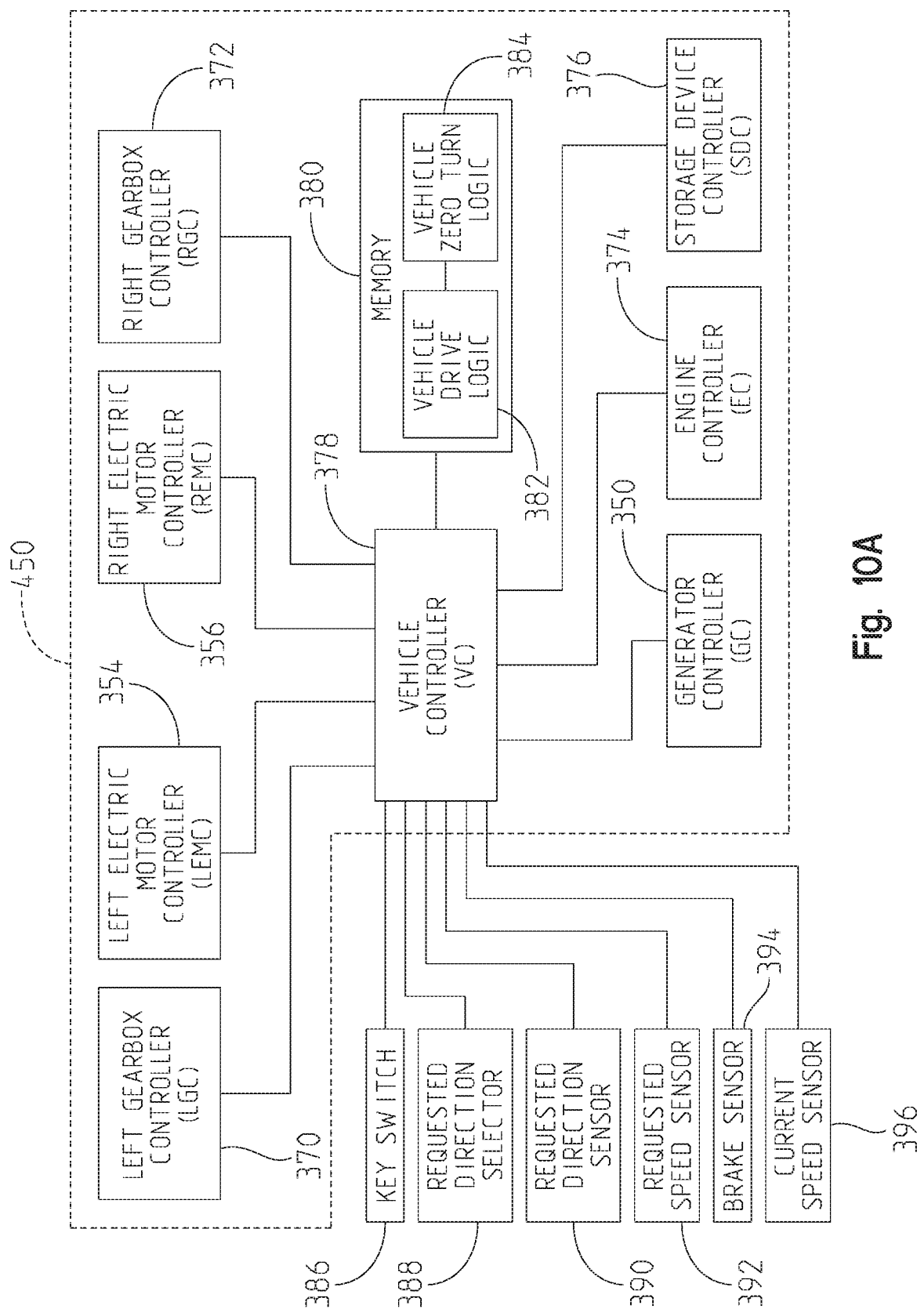
FIG. 10A is a representative view of at least one controller of the embodiment of the vehicle of FIG. 1.

Referring to FIG. 10A, vehicle 100 includes a plurality of controllers including generator controller 350, motor controller 354, motor controller 356, a left gearbox controller 370, a right gearbox controller 372, an engine controller 374, and a storage device controller 376. Left gearbox controller 370 and right gearbox controller 372 control the operation of left side gearbox 310 and right side gearbox 312, respectively. For example, in one embodiment left side gearbox 310 and right side gearbox 312 include multiple gear settings, such as a low speed/high torque gear and a high speed gear. Left gearbox controller 370 and right gearbox controller 372 control the switching between gears of left side gearbox 310 and right side gearbox 312. Engine controller 374 monitors and controls the operation of internal combustion engine 302. In an exemplary embodiment, internal combustion engine 302 is an internal combustion engine having an electronically controlled throttle valve controlled by engine controller 374. An exemplary engine control system is detailed further herein and in U.S. patent application Ser. No. 13/153,037, filed on Jun. 3, 2011, titled "ELECTRONIC THROTTLE CONTROL," the entire disclosure of which is incorporated by reference herein. F302 may be of the type detailed in U.S. patent application Ser. No. 13/242,239, filed on Sep. 23, 2011, titled "ENGINE," the entire disclosure of which is incorporated by reference herein. Storage device controller 376 monitors a state of charge of storage devices 366 and controls the operation of storage devices 366. Generator controller 350, motor controller 354, and motor controller 356 monitor and control the operation of electrical generator 304, left side electric motor 306, and right side electric motor 308, respectively.

Vehicle 100 further includes a vehicle controller 378 which monitors and controls the overall operation of vehicle 100. Vehicle controller 378 communicates with each of generator controller 350, motor controller 354, motor controller 356, left gearbox controller 370, right gearbox controller 372, engine controller 374, and storage device controller 376 during operation of vehicle 100. In one embodiment, indicated by the dashed line in FIG. 10A, the functionality of each of generator controller 350, motor controller 354, motor controller 356, left gearbox controller 370, right gearbox controller 372, engine controller 374, storage device controller 376, and vehicle controller 378 may be combined together in a single controller 450. In the illustrated embodiment, generator controller 350, motor controller 354, motor controller 356, left gearbox controller 370, right gearbox controller 372, engine controller 374, storage device controller 376, and vehicle controller 378 are microprocessor-based controllers and each may include a non-transitory computer readable medium which includes processing instructions stored therein that are executable by the microprocessor.

Referring to FIG. 10, vehicle controller 378 is shown having access to a non-transitory computer readable medium 380 which includes vehicle drive logic 382 and vehicle zero turn logic 384. As explained in more detail herein, vehicle drive logic 382 relates to the control of drive assembly 300 to move vehicle 100 at a requested speed and a requested direction. Vehicle zero turn logic 384 relates to the control of drive assembly 300 to execute a zero point turn with vehicle 100.

A non-transitory computer-readable medium, such as non-transitory computer readable medium 380, may include random access memory (RAM), read-only memory (ROM), erasable programmable read-only memory (e.g., EPROM, EEPROM, or Flash memory), or any other tangible medium capable of storing information. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which generator controller 350, motor controller 354, motor controller 356, left gearbox controller 370, right gearbox controller 372, engine controller 374, storage device controller 376, and vehicle controller 378 are not microprocessor-based, but rather are configured to control operation of vehicle 100 based on one or more sets of hardwired instructions and/or software instructions stored in the memory unit 380. Further, generator controller 350, motor controller 354, motor controller 356, left gearbox controller 370, right gearbox controller 372, engine controller 374, storage device controller 376, and vehicle controller 378 may be networked together over a suitable communicates network, such as a CAN network, or combined into a single device, such as controller 450.

Referring to FIG. 11, high voltage bus 352 connects generator controller 350, motor controller 354, and motor controller 356. Further, if storage devices 366 are included, high voltage bus 352 further connects to storage device controller 376. High voltage bus 352 receives energy produced by electrical generator 304, receives energy stored in storage devices 366, and receives energy recovered by left side electric motor 306 and right side electric motor 308 through regenerative braking. High voltage bus 352 further provides energy to storage devices 366 for storage and provides energy to left side electric motor 306 and right side electric motor 308 to power movement of left side continuous track 104 and right side continuous track 112, respectively. It is contemplated that in certain situations, the energy provided to left side electric motor 306 and right side electric motor 308 over high voltage bus 352 may include a first portion provided from electrical generator 304 and a second portion provided from storage devices 366.

In one embodiment, wherein energy is to be combined from electrical generator 304 and storage devices 366 to power left side electric motor 306 and right side electric motor 308, high voltage bus 352 operates as a DC high voltage bus. If electrical generator 304 is an AC generator, generator controller 350 includes a rectifier to convert the AC power to DC power that is provided to high voltage bus 352. Left side electric motor 306 and right side electric motor 308 may be either DC motors or AC motors. If left side electric motor 306 and right side electric motor 308 are DC motors, the power provided by high voltage bus 352 may be directly applied to left side electric motor 306 and right side electric motor 308 by motor controller 354 and motor controller 356. If left side electric motor 306 and right side electric motor 308 are AC motors, each of motor controller 354 and motor controller 356 include inverters to convert the DC power to AC power.

In one embodiment, wherein electrical generator 304 is an AC generator and left side electric motor 306, right side electric motor 308 are AC motors, and power is not being provided from storage devices 366 or storage devices 366 are not included, high voltage bus 352 may operate as an AC high voltage bus. Motor controller 354 and motor controller 356 may include further circuitry to alter the frequency and other characteristics of the provided AC power. If electrical generator 304 is a DC generator, generator controller 350 may include an inverter to convert the DC power to AC power. If storage devices 366 are provided, storage device controller 376 may include an inverter to convert the stored energy in storage devices 366 to AC power for use by left side electric motor 306 and right side electric motor 308 when storage devices 366 are powering left side electric motor 306 and right side electric motor 308 and may include a rectifier to convert AC power on high voltage bus 352 to DC power for charging of storage devices 366.

Vehicle controller 378 receives multiple inputs from sensors and operator actuatable inputs of vehicle 100. Referring to FIG. 10A, a key switch input 386 is actuatable by the operator and provides an indication to vehicle controller 378 when an operator turns on vehicle 100. An exemplary implementation of key switch input 386 is shown in FIG. 16. The indication may be a completion of a circuit or may be a characteristic monitored by a sensor.

A requested direction selector 388 is actuatable by an operator and provides an indication to vehicle controller 378 of whether the operator desires to drive vehicle 100 in a forward direction, drive vehicle 100 in a reverse direction, or execute a zero point turn. An exemplary implementation of requested direction selector 388 is shown in FIG. 16. In FIG. 16, requested direction selector 388 is a three position toggle switch wherein a first position (denoted "F") corresponds to a request to drive vehicle 100 in a forward direction, a second position (denoted "N") corresponds to a request to execute a zero point turn, and a third position (denoted "R") corresponds to a request to drive vehicle 100 in a reverse direction. Vehicle controller 378 monitors the position of requested direction selector 388.

A requested direction sensor 390 monitors a steering input of vehicle 100. In the illustrated embodiment of FIG. 16, an exemplary steering input is steering wheel 398. Requested direction sensor 390 monitors whether steering wheel 398 is rotated in direction 400 indicating a request to turn vehicle 100 to the left or rotated in direction 402 indicating a request to turn vehicle 100 to the right. The magnitude of the rotation of steering wheel 398 is also monitored to determine a requested sharpness of the requested turn. Exemplary sensors include torque sensors discussed in more detail in US2016121905, titled SYSTEM AND METHOD FOR CONTROLLING A VEHICLE, filed Oct. 30, 2015, the entire disclosure of which is expressly incorporated by reference herein. Although a steering wheel is shown as an exemplary steering input other exemplary steering inputs, such as handlebars and other devices may be used.

A requested speed sensor 392 monitors a position of an operator actuatable throttle input, illustratively in FIG. 16 an accelerator foot pedal 404. Other exemplary throttle inputs a thumb actuated lever, a twist grip, or any other suitable operator input device that, when actuated by an operator, is configured to provide an operator throttle demand to vehicle controller 378. Requested speed sensor 392 monitors whether pedal 404 is depressed and the magnitude of the depression. Exemplary sensors include position sensors discussed in more detail in US2016121905, titled SYSTEM AND METHOD FOR CONTROLLING A VEHICLE, filed Oct. 30, 2015, and in U.S. patent application Ser. No. 13/152,981, filed Jun. 3, 2011, entitled ELECTRONIC THROTTLE CONTROL, the entire disclosures of which are expressly incorporated by reference herein.

A brake input sensor 394 monitors a position of an operator actuatable brake input, illustratively in FIG. 16 a brake foot pedal 406. Other exemplary brake inputs a thumb actuated lever, a hand lever, or any other suitable operator input device that, when actuated by an operator, is configured to provide an operator brake demand to vehicle controller 378. Brake input sensor 394 monitors whether pedal 406 is depressed and the magnitude of the depression. Exemplary sensors include position sensors discussed in more detail in US2016121905, titled SYSTEM AND METHOD FOR CONTROLLING A VEHICLE, filed Oct. 30, 2015, the entire disclosure of which is expressly incorporated by reference herein.

A speed sensor 396 monitors a current vehicle ground speed of vehicle 100. In one embodiment, speed sensor 396 monitors a rotation rate of one of left side drive shaft 314 and right side drive shaft 316 to determine a current speed of vehicle 100. In one embodiment, two speed sensors are provided, one for left side drive shaft 314 and one for right side drive shaft 316.

Figure 17:
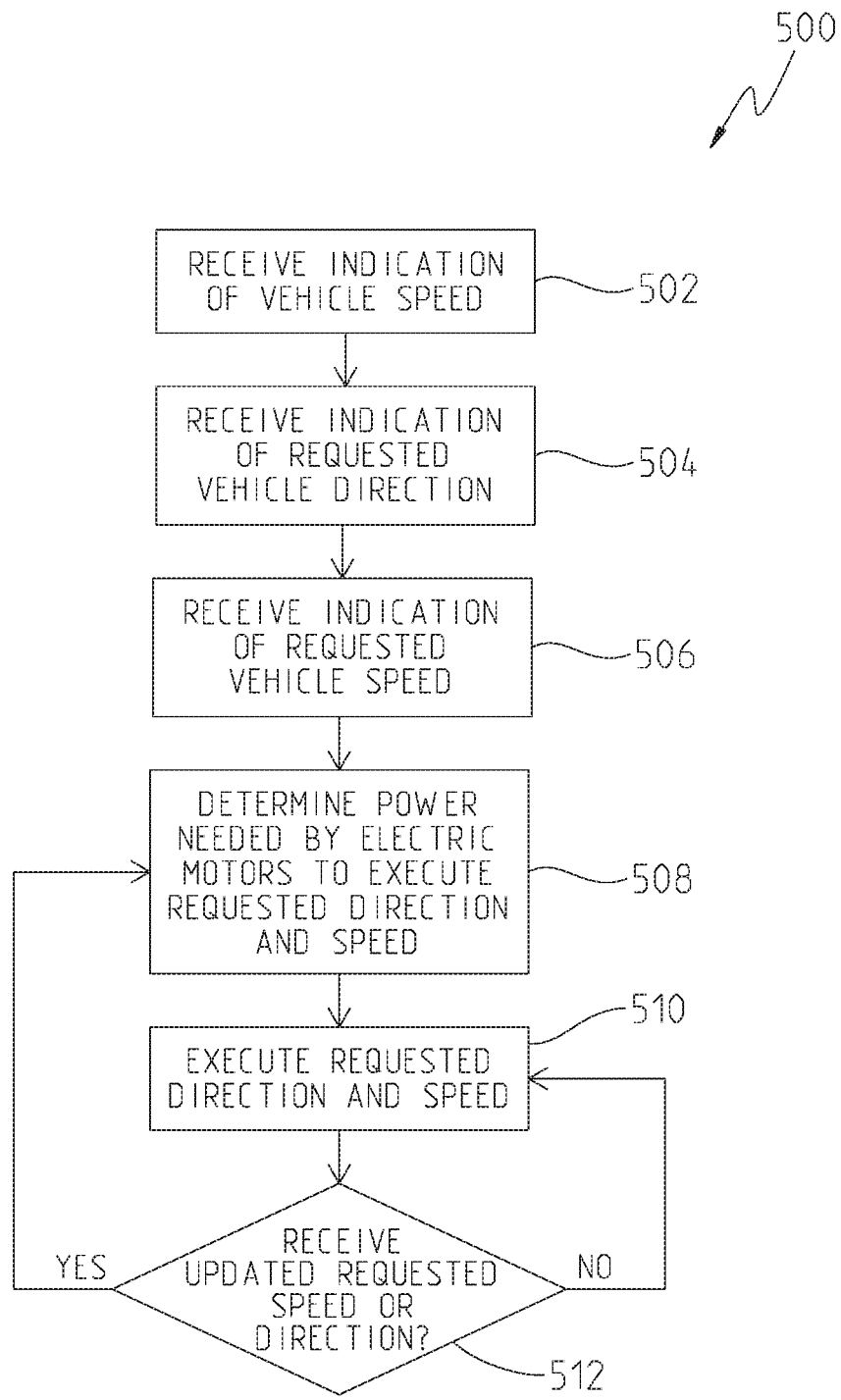
FIG. 17 is an exemplary processing sequence of the at least one controller of the embodiment of the vehicle of FIG. 1.
Figure 18:
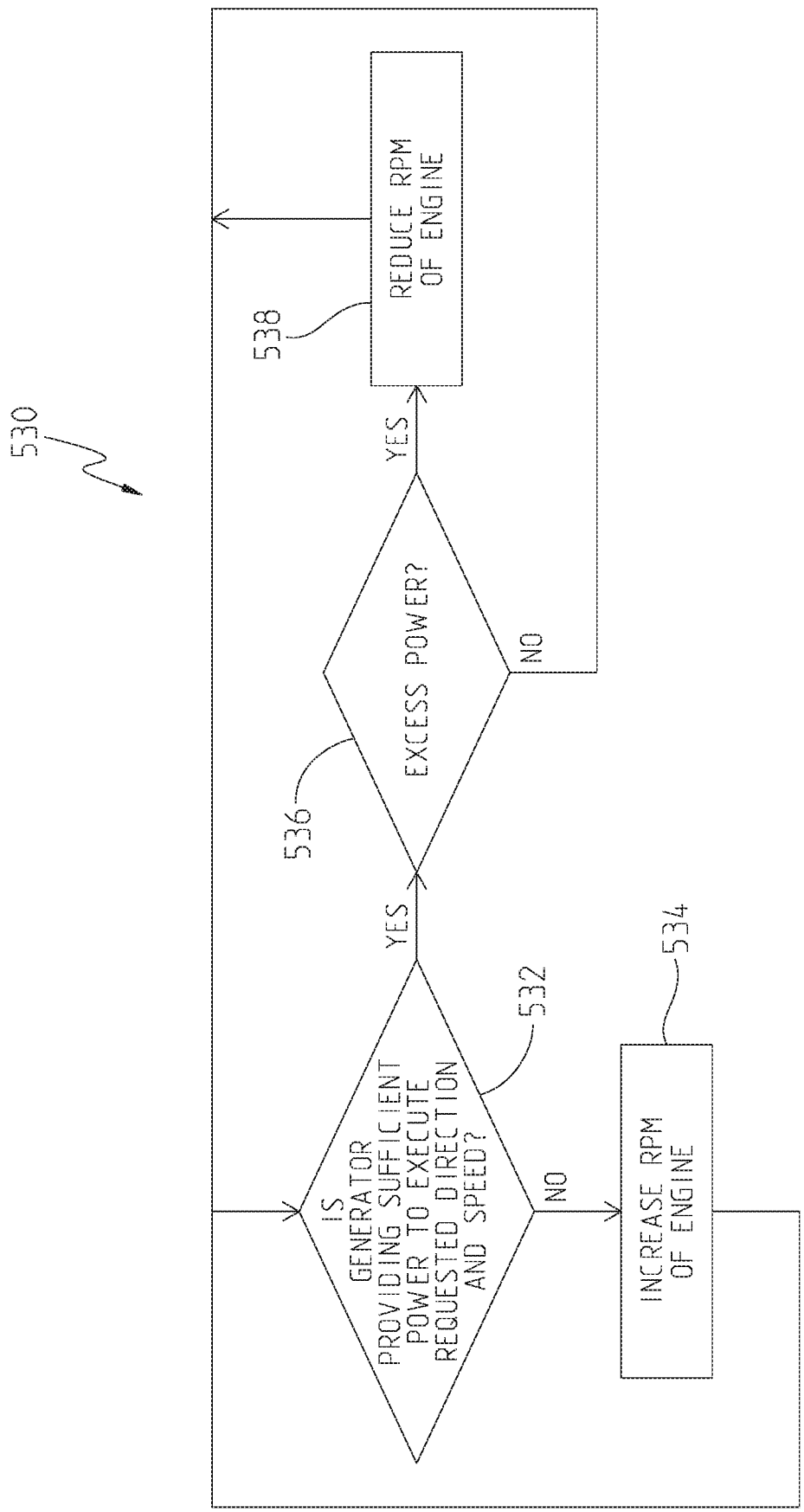
FIG. 18 is another exemplary processing sequence of the at least one controller of the embodiment of the vehicle of FIG. 1.

An exemplary processing sequence 500 for vehicle drive logic 382 of controller 378 is illustrated in FIG. 17. Vehicle drive logic 382 receives an indication of a current ground speed of vehicle 100, as represented by block 502. In the illustrated embodiment, the indication of the current ground speed is provided by speed monitoring device, speed sensor 396. Vehicle drive logic 382 further receives an indication of a requested vehicle direction, as represented by block 504. In the illustrated embodiment, the indication of the requested vehicle direction is provided by requested direction sensor 390. Vehicle drive logic 382 further receives an indication of a requested vehicle speed, as represented by block 506. In the illustrated embodiment, the indication of the requested vehicle speed is provided by requested speed sensor 392.

Vehicle drive logic 382 determines the power needed by first electric motor 306 and second electric motor 308 to drive the left side continuous track 104 and the right side continuous track 112 at the requested vehicle speed and direction, as represented by block 508. In one embodiment, vehicle drive logic 382 refers to a table of required power for each of first electric motor 306 and second electric motor 308 to generate a desired rotation speed of left side continuous track 104 and the right side continuous track 112, respectively. Vehicle drive logic 382 executes the requested vehicle direction and vehicle speed, as represented by block 510. In one embodiment, controller 378 executes vehicle drive logic 382 and communicates the required motor speeds of electric motors 306, 308 to motor controllers 354, 356 and the power needed to generator controller 350. In another embodiment, motor controllers 354, 356 execute vehicle drive logic 382 to determine the required motor speeds of electric motors 306, 308 and communicate the power needed to generator controller 350.

In order to drive vehicle 100 in a straight direction, each of first electric motor 306 and second electric motor 308, assuming first electric motor 306 and second electric motor 308 are identical, is driven with the same power to generate the same rotational speed of drive sprocket 108 and drive sprocket 118. This further assumes that the terrain encountered by each of left side continuous track 104 and right side continuous track 112 is generally the same. In one embodiment, a speed sensor 396 is provided for each of drive sprocket 108 and drive sprocket 118 and vehicle drive logic 382 knows the expected rotational speed of each of drive sprocket 108 and drive sprocket 118 and makes adjustments to supplied power based on deviations from the expected. In order to drive vehicle 100 through a left hand turn, drive sprocket 108 is rotated slower than drive sprocket 118. The magnitude of the difference in rotation speed dictates the sharpness of the left hand turn. In order to drive vehicle 100 through a right hand turn, drive sprocket 118 is rotated slower than drive sprocket 108. The magnitude of the difference in rotation speed dictates the sharpness of the right hand turn. Vehicle drive logic 382 continues to monitor each of requested direction selector 388 and requested direction sensor 390 to determine if updated requests have been provided by the operator, as represented by block 512.

An exemplary processing sequence 530 of vehicle drive logic 382 for vehicle controller 378 is provided. Vehicle controller 378 determines if electrical generator 304 is providing the sufficient power to execute the requested speed and direction of vehicle 100, as represented by block 532. In one embodiment, vehicle controller 378 monitors a power level on high voltage bus 352 to make this determination. If not, vehicle controller 378 instructs generator controller 350 to increase the revolutions per minute (RPM) of internal combustion engine 302, as represented by block 534. If yes, vehicle controller 378 determines if electrical generator 304 is providing excess power, as represented by block 536. If not, vehicle controller 378 returns to monitoring the power level provided by electrical generator 304. If excess power is being produced, vehicle controller 378 instructs generator controller 350 to decrease the RPM of internal combustion engine 302, as represented by block 538.

Figure 19:
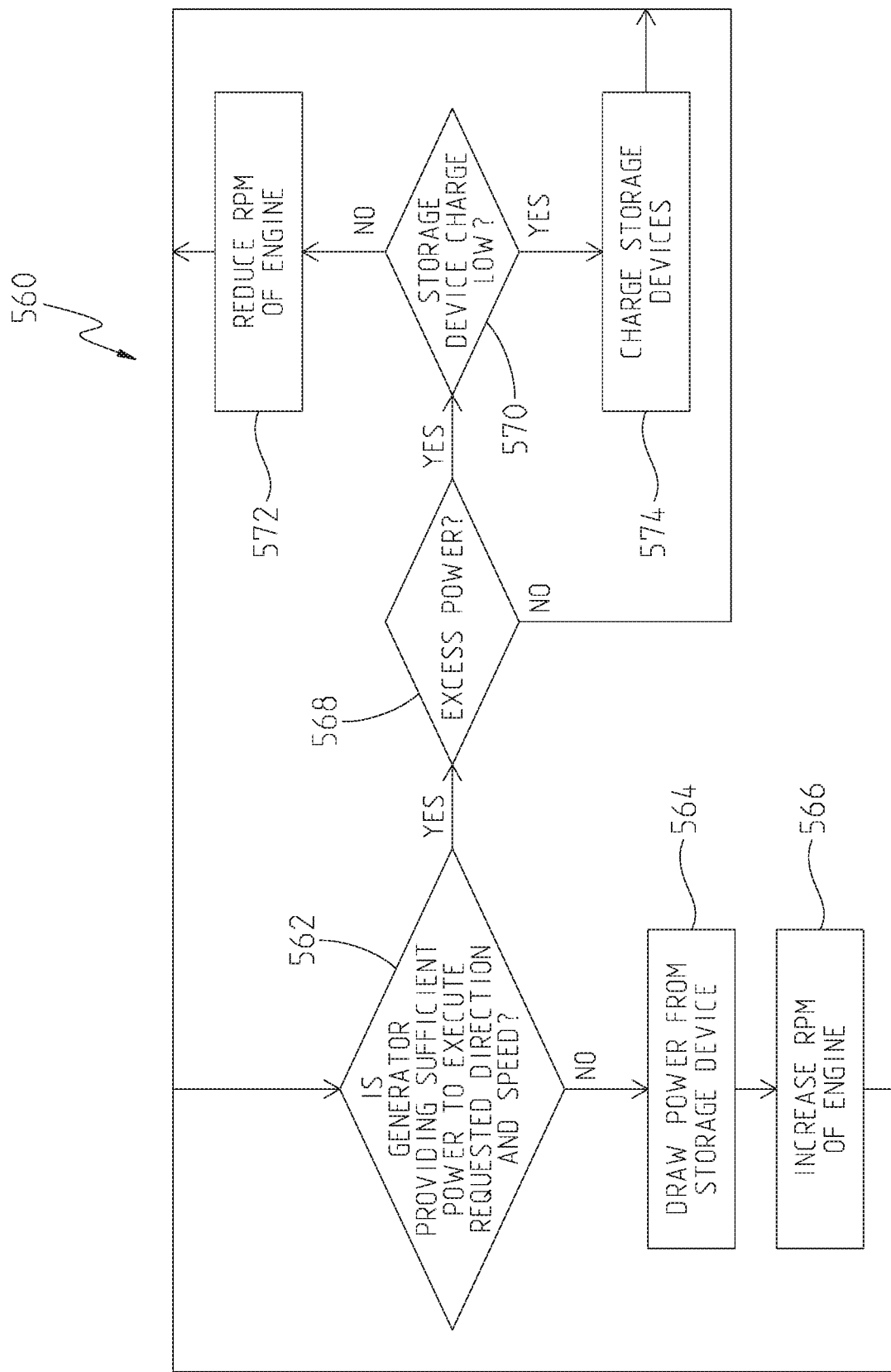
FIG. 19 is yet another exemplary processing sequence of the at least one controller of the embodiment of the vehicle of FIG. 1.
Figure 20:
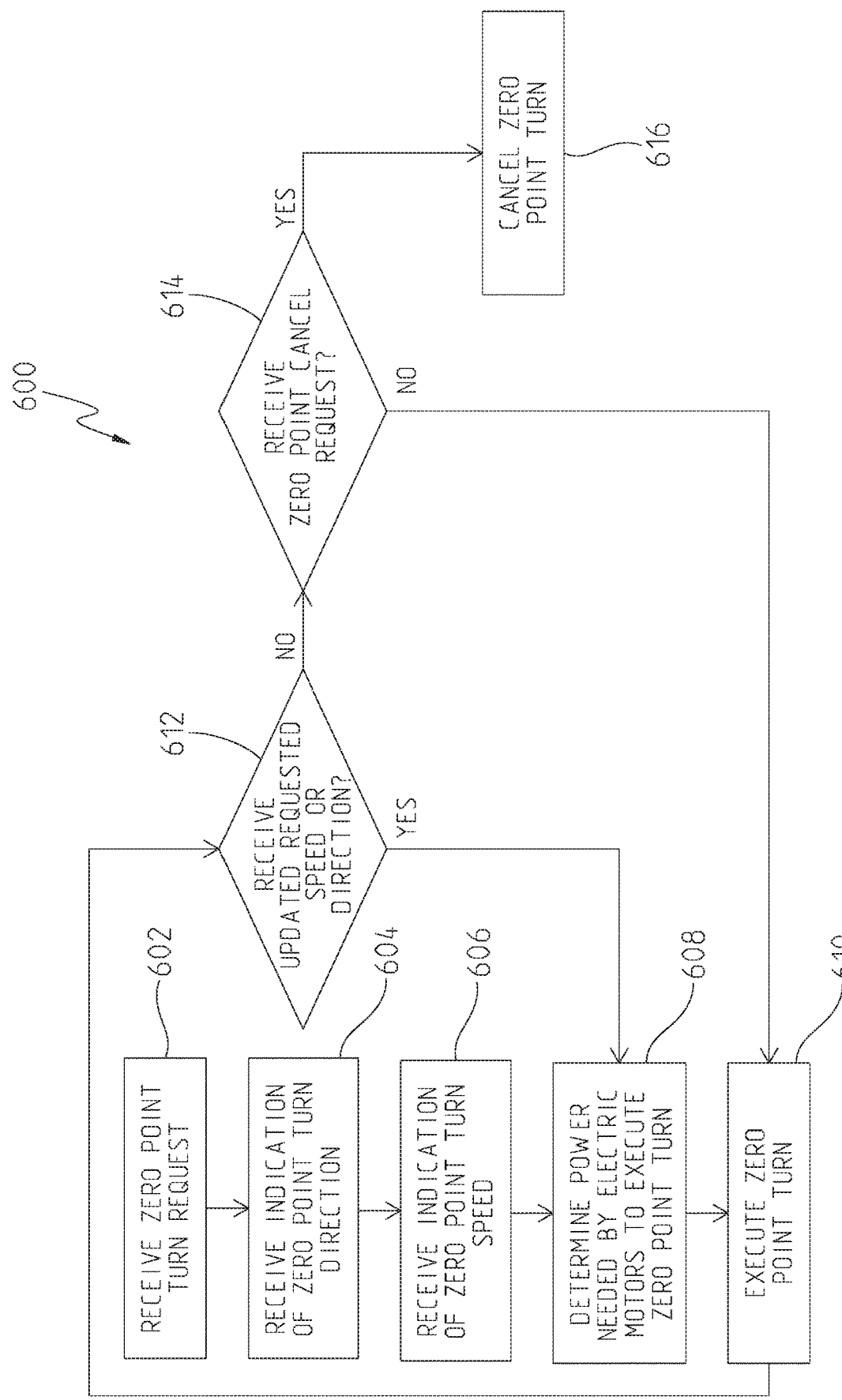
FIG. 20 is a yet a further exemplary processing sequence of the at least one controller of the embodiment of the vehicle of FIG. 1.

An exemplary processing sequence 560 of vehicle drive logic 382 for vehicle controller 378 is provided for an embodiment including storage devices 366 in FIG. 19. Vehicle controller 378 determines if electrical generator 304 is providing the sufficient power to execute the requested speed and direction of vehicle 100, as represented by block 562. In one embodiment, vehicle controller 378 monitors a power level on high voltage bus 352 to make this determination. If not, vehicle controller 378 either instructs storage device controller 376 to provide power from storage devices 366, as represented by block 564, instructs generator controller 350 to increase the revolutions per minute (RPM) of internal combustion engine 302, as represented by block 566, or both. If yes, vehicle controller 378 determines if electrical generator 304 is providing excess power, as represented by block 568. If not, vehicle controller 378 returns to monitoring the power level provided by electrical generator 304. If excess power is being produced, vehicle controller 378 determines whether storage devices 366 need charging, as represented by block 570. In one embodiment, storage device controller 376 compares the charge level of storage devices 366 to a threshold and reports to vehicle controller 378 if storage devices 366 need charging. If not, vehicle controller 378 instructs generator controller 350 to decrease the RPM of internal combustion engine 302, as represented by block 572. If storage devices 366 need charging, vehicle controller 378 instructs storage device controller 376 to charge storage devices 366, as represented by block 574.

An exemplary processing sequence 600 for vehicle zero turn logic 384 of controller 378 is illustrated in FIG. 17. A zero point turn is a change in direction of vehicle 100 performed without an appreciable movement of vehicle 100 in either a forward or reverse direction. Rather, vehicle 100 substantially appears to be rotating about a point midway between left side continuous track 104 and right side continuous track 112.

Referring to FIG. .17, vehicle zero turn logic 384 receives an indication of a requested zero point turn from the operator, as represented by block 602. In the illustrated embodiment, the request corresponds to the operator toggling requested direction selector 388 to the N position. Vehicle zero turn logic 384 further receives an indication of a requested vehicle zero turn direction, as represented by block 604. In the illustrated embodiment, the indication of the requested vehicle direction is provided by requested direction sensor 390. Turning steering wheel 398 to the left provides an indication of a counterclockwise zero point turn while turning steering wheel 398 to the right provides an indication of a clockwise zero point turn. Vehicle zero turn logic 384 further receives an indication of a requested zero turn speed, as represented by block 606. In the illustrated embodiment, the indication of the requested vehicle zero turn speed is provided by pedal input 404.

Vehicle zero turn logic 384 determines the power needed by first electric motor 306 and second electric motor 308 to drive the left side continuous track 104 and the right side continuous track 112 at the requested zero turn direction and speed, as represented by block 608. In one embodiment, vehicle zero turn logic 384 refers to a table of required power for each of first electric motor 306 and second electric motor 308 to generate a desired rotation speed of left side continuous track 104 and the right side continuous track 112, respectively. In one embodiment, controller 378 instructs controller 350 to generate the required level of power for left side electric motor 306 and right side electric motor 308. Generator controller 350, in turn, instructs engine controller 374 to operate internal combustion engine 302 at a sufficient level to have electrical generator 304 generate the required power. Vehicle zero turn logic 384 further determines the polarity of the voltage to be applied by each of motor controller 354 and motor controller 356 to left side electric motor 306 and right side electric motor 308, when left side electric motor 306 and right side electric motor 308 are DC motors. To execute the zero point turn, in one embodiment, left side continuous track 104 and right side continuous track 112 are rotated in opposite directions which may be achieved by applying a positive DC voltage to one of left side electric motor 306 and right side electric motor 308 and a negative DC voltage to the other of left side electric motor 306 and right side electric motor 308.

Vehicle zero turn logic 384 executes the requested zero point turn, as represented by block 610. Vehicle zero turn logic 384 continues to monitor each of requested direction selector 388 and requested direction sensor 390 to determine if updated requests have been provided by the operator, as represented by block 612, or if the zero point turn request has been cancelled, as represented by block 614. In one embodiment, the zero point turn request is cancelled by placing selector 388 in one of the F position and the R position. If cancelled, vehicle zero turn logic 384 is exited, as represented by block 616.

Vehicle 100 is configurable in many modes of operation. In one mode of operation, left side electric motor 306 and right side electric motor 308 are powered by both storage devices 366 and electrical generator 304. For example, during vehicle launch, vehicle controller 378 may request storage devices 366 to provide a first part of the determined power demand for left side electric motor 306 and right side electric motor 308 and a second part of the determined power demand for left side electric motor 306 and right side electric motor 308 to be provided from the internal combustion engine 302 through the generator 304. The first part being provided for a first time period and the second part being provided during a second time period. The second time period being longer than the first time period. The first and second time periods may overlap. The first and second time periods may not overlap.

In another mode of operation, vehicle controller 378 instructs generator controller 350 to generate a first level of power while vehicle 100 is not moving to charge storage devices 366 when a charge level of storage devices 366 is below a threshold. Generator controller 350 determines the rotational speed of crankshaft 358 of internal combustion engine 302 needed to produce the first level of power and instructs engine controller 374 to operate internal combustion engine 302 to provide the required rotational speed. Storage device controller 376 then removes power from high voltage bus 352 to charge storage devices 366.

In yet another mode of operation, vehicle controller 378 instructs generator controller 350 to generate a first level of power which is sufficient to both rotate left side continuous track 104 and right side continuous track 112 at a desired rate and charge storage devices 366 when a charge level of storage devices 366 is below a threshold. Generator controller 350 determines the rotational speed of crankshaft 358 of internal combustion engine 302 needed to produce the first level of power and instructs engine controller 374 to operate internal combustion engine 302 to provide the required rotational speed. Storage device controller 376 then removes power from high voltage bus 352 to charge storage devices 366 and motor controller 354 and motor controller 356 remove power from high voltage bus 352 to operate left side electric motor 306 and right side electric motor 308.

In a further mode of operation, vehicle controller 378 instructs engine controller 374 to turn off internal combustion engine 302, if running, and storage device controller 376 to provide sufficient power from storage devices 366 to operate vehicle 100 at the requested speed and direction. In yet another mode of operation, vehicle controller 378 based on input from brake input sensor 394 instructs storage device controller 376 to charge storage devices 366 with energy recaptured from regenerative braking.

In still a further mode of operation, electrical generator 304 provides power to storage devices 366 instead of left side electric motor 306 and right side electric motor 308. Storage devices 366, in turn, deliver power to left side electric motor 306 and right side electric motor 308 to satisfy requested vehicle speeds, directions, and zero point turn requests.

Referring to FIG. .12, vehicle 100 includes a low voltage system 410 having a low voltage bus 412 that provides power to the various components of vehicle 100 including generator controller 350, vehicle controller 378, storage device controller 376, engine controller 374, right gearbox controller 372, second motor controller 356, first motor controller 354, left gearbox controller 370, speed sensor 396, brake input sensor 394, requested speed sensor 392, and requested direction sensor 390. In the illustrated embodiment, low voltage system 410 includes a low voltage battery 414, such as 12 Volts or 24 Volts, to power low voltage bus 412. In one example, low voltage battery 414 is charged by the power on high voltage bus 352 through a DC to DC converter 420. In another example, low voltage battery 414 is charged by the power stored in storage devices 366 through DC to DC converter 420. In a further example, vehicle 100 does not include low voltage battery 414, rather DC to DC converter pulls power from storage devices 366 and/or high voltage bus 352 to power the components on low voltage bus 412.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A tracked all-terrain vehicle, comprising:
a plurality of ground engaging members including a right side endless track assembly including a right side continuous track and a left side endless track assembly including a left side continuous track having a forward most leading edge, a rearward most trailing edge, and a mid-plane located perpendicular to a longitudinal centerline plane of the tracked all-terrain vehicle and equidistant between the forward most leading edge of the left side continuous track and the rearward most trailing edge of the left side continuous track;
a frame supported by the plurality of ground engaging members;
an internal combustion engine supported by the frame and positioned completely rearward of the mid-plane of the left side continuous track of the tracked all-terrain vehicle;
a generator operatively coupled to the internal combustion engine through a first mechanical linkage, the generator being positioned completely rearward of the mid-plane of the left side continuous track of the tracked all-terrain vehicle;
a first electric motor positioned completely forward of the mid-plane of the left side continuous track of the tracked all-terrain vehicle and operatively coupled to the left side endless track assembly to drive movement of the left side continuous track;
a second electric motor positioned completely forward of the mid-plane of the left side continuous track of the tracked all-terrain vehicle and operatively coupled to the right side endless track assembly to drive movement of the right side continuous track;
at least one storage device;
a high voltage bus operatively coupled to the at least one storage device, the generator, the first electric motor, and the second electric motor, power being provided to the high voltage bus from the generator independent of the at least one storage device and power being provided to the high voltage bus from the at least one storage device independent of the generator;
a first controller operative to cause power to be supplied from the at least one storage device via the high voltage bus to one or both of the first electric motor and the second electric motor independent of the generator, the first controller providing a first part of the determined power demand of the first electric motor and the second electric motor from energy stored in the at least one storage device;
a second controller operative to cause power to be supplied from the generator via the high voltage bus to one or both of the first electric motor and the second electric motor independent of the at least one storage device, the second controller providing a second part of the determined power demand of the first electric motor and the second electric motor from the internal combustion engine through the generator, the first part being provided for a first time period and the second part being provided during a second time period, the second time period being longer than the first time period;

a third controller operatively coupled to the internal combustion engine, the first electric motor, and the second electric motor;

a speed monitoring device supported by the plurality of ground engaging members and operatively coupled to the third controller to provide an indication of a ground speed of the tracked all-terrain vehicle;

a first operator input actuatable by an operator of the tracked all-terrain vehicle, the first operator input being operatively coupled to the third controller to provide an indication of a requested vehicle speed to the third controller; and a second operator input actuatable by an operator of the tracked all-terrain vehicle, the second operator input being operatively coupled to the third controller to provide an indication of a requested vehicle travel direction to the third controller, wherein, based on the indication of the ground speed of the tracked all-terrain vehicle, the indication of the requested vehicle speed, and the indication of the requested vehicle travel direction the third controller determines a power demand of the first electric motor and the second electric motor to achieve the requested vehicle speed and the requested vehicle direction and controls an output of the internal combustion engine based on the determined power demand of the first electric motor and the second electric motor.

2. The tracked all-terrain vehicle of claim 1, further comprising:

a first drive unit operatively coupled to the left side continuous track of the left side endless track assembly to drive movement of the left side continuous track of the left side endless track assembly and operatively coupled to the first electric motor through a second mechanical linkage; and a second drive unit operatively coupled to the right side continuous track of the right side endless track assembly to drive movement of the right side continuous track of the right side endless track assembly and operatively coupled to the second electric motor through a third mechanical linkage, wherein the first mechanical linkage is completely rearward of the mid-plane of the left side continuous track of the tracked all-terrain vehicle, the second mechanical linkage is completely forward of the mid-plane of the left side continuous track of the tracked all-terrain vehicle, and the third mechanical linkage is completely forward of the mid-plane of the left side continuous track of the tracked all-terrain vehicle.

3. The tracked all-terrain vehicle of claim 2, further comprising a tub supported by the plurality of ground engaging members, wherein the internal combustion engine, the generator, the first electric motor, and the second electric motor are received in an interior of the tub.

4. The tracked all-terrain vehicle of claim 3, wherein the at least one storage device is positioned in the interior of the tub.

5. The tracked all-terrain vehicle of claim 4, wherein the at least one storage device is positioned forward of the first mechanical linkage, and rearward of the second mechanical linkage.

6. The tracked all-terrain vehicle of claim 4, wherein the at least one storage device is operatively coupled to the first electric motor and the second electric motor via the high voltage bus to provide power to each of the first electric motor and the second electric motor.

7. The tracked all-terrain vehicle of claim 1, the first controller providing at least part of the determined power demand of the first electric motor and the second electric motor from energy stored in the at least one storage device.

8. The tracked all-terrain vehicle of claim 1, wherein the at least one storage device includes a supercapacitor.

9. The tracked all-terrain vehicle of claim 1, wherein the at least one storage device includes a plurality of batteries.

10. The tracked all-terrain vehicle of claim 1, wherein the first time period and the second time period overlap.

11. The tracked all-terrain vehicle of claim 1, further comprising:

a first turn-related operator input actuatable by an operator of the vehicle, the first turn-related operator input being operatively coupled to the third controller to provide a zero point turn request to the third controller;

a second turn-related operator input actuatable by an operator of the vehicle, the second turn-related operator input being operatively coupled to the third controller to provide an indication of a requested zero point turn speed to the third controller; and a third turn-related operator input actuatable by an operator of the vehicle, the third turn-related operator input being operatively coupled to the third controller to provide an indication of a requested zero point turn direction to the third controller, wherein, in response to the zero point turn request, the third controller controls the first electric motor and the second electric motor to execute a zero point turn having the requested zero point turn speed and the requested zero point turn direction.

12. The tracked all-terrain vehicle of claim 11, wherein, in executing the zero point turn, the third controller controls the first electric motor to move the left side continuous track in one of a forward direction and a reverse direction and the second electric motor to move the right side continuous track in the other of the forward direction and the reverse direction.

13. The tracked all-terrain vehicle of claim 1, wherein the first controller provides at least part of the determined power demand of the first electric motor and the second electric motor from energy stored in the at least one storage device via the high voltage bus.

14. The tracked all-terrain vehicle of claim 1, wherein the first time period and the second time period do not overlap.

15. A tracked all-terrain vehicle, comprising:

a plurality of ground engaging members including a right side endless track assembly including a right side continuous track and a left side endless track assembly including a left side continuous track;

a frame supported by the plurality of ground engaging members;

a plurality of electric motors supported by the plurality of ground engaging members, the plurality of electric motors including a first electric motor operatively coupled to the left side endless track assembly to drive movement of the left side continuous track and a second electric motor operatively coupled to the right side endless track assembly to drive movement of the right side continuous track independent of the left side continuous track;

at least one controller operatively coupled to the plurality of electric motors;

an internal combustion engine supported by the plurality of ground engaging members and operatively coupled to the at least one controller;

at least one storage device;

an electric generator driven by the internal combustion engine, the electric generator being operatively coupled via a high voltage bus to the plurality of electric motors to provide power to the plurality of electric motors independent of the at least one storage device, the at least one storage device being operatively coupled via the high voltage bus to the plurality of electric motors to provide power to the plurality of electric motors independent of the electric generator, the at least one controller being operative to cause power to be supplied from the at least one storage device via the high voltage bus to the plurality of electric motors independent of the electric generator, the at least one controller being further operative to cause power to be supplied from the generator via the high voltage bus to the plurality of electric motors independent of the at least one storage device;

a speed monitoring device supported by the plurality of ground engaging members and operatively coupled to the at least one controller to provide an indication of a ground speed of the vehicle;

a first operator input actuatable by an operator of the vehicle, the first operator input being operatively coupled to the at least one controller to provide an indication of a requested vehicle speed to the at least one controller; and a second operator input actuatable by an operator of the vehicle, the second operator input being operatively coupled to the at least one controller to provide an indication of a requested vehicle travel direction to the at least one controller, wherein, based on the indication of the ground speed of the vehicle, the indication of the requested vehicle speed, and the indication of the requested vehicle travel direction, the at least one controller determines a power demand of the first electric motor and the second electric motor to achieve the requested vehicle speed and the requested vehicle direction and controls an output of the internal combustion engine based on the determined power demand of the plurality of electric motors.

16. The tracked all-terrain vehicle of claim 15, the at least one controller providing a first part of the determined power demand of the first electric motor and the second electric motor from energy stored in the at least one storage device and a second part of the determined power demand of the first electric motor and the second electric motor from the internal combustion engine through the generator, the first part being provided for a first time period and the second part being provided during a second time period, the second time period being longer than the first time period.

17. The tracked all-terrain vehicle of claim 16, wherein the first time period and the second time period overlap.

18. The tracked all-terrain vehicle of claim 16, wherein the first part provides all of the determined power demand.

19. The tracked all-terrain vehicle of claim 16, wherein the second part provides all of the determined power demand.

20. The tracked all-terrain vehicle of claim 16, wherein the first time period and the second time period do not overlap.

21. The tracked all-terrain vehicle of claim 15, wherein the at least one storage device includes a supercapacitor.

22. The tracked all-terrain vehicle of claim 15, wherein the at least one storage device includes a plurality of batteries.

23. The tracked all-terrain vehicle of claim 22, further comprising:

a first mechanical linkage operatively coupling the internal combustion engine to the generator;

a first drive unit operatively coupled to the left side continuous track of the left side endless track assembly to drive movement of the left side continuous track of the left side endless track assembly and operatively coupled to the first electric motor through a second mechanical linkage; and a second drive unit operatively coupled to the right side continuous track of the right side endless track assembly to drive movement of the right side continuous track of the right side endless track assembly and operatively coupled to the second electric motor through a third mechanical linkage, wherein the at least one storage device is positioned forward of the first mechanical linkage and rearward of the second mechanical linkage.

24. A tracked all-terrain vehicle, comprising:

a plurality of ground engaging members including a right side endless track assembly including a right side continuous track and a left side endless track assembly including a left side continuous track;

a frame supported by the plurality of ground engaging members;

a plurality of electric motors supported by the plurality of ground engaging members, the plurality of electric motors including a first electric motor operatively coupled to the left side endless track assembly to drive movement of the left side continuous track and a second electric motor operatively coupled to the right side endless track assembly to drive movement of the right side continuous track independent of the left side continuous track;

at least one controller operatively coupled to the plurality of electric motors;

an internal combustion engine supported by the plurality of ground engaging members and operatively coupled to the at least one controller;

at least one storage device;

an electric generator driven by the internal combustion engine, the electric generator being operatively coupled via a high voltage bus to the plurality of electric motors to provide power to the plurality of electric motors independent of the at least one storage device, the at least one storage device being operatively coupled via the high voltage bus to the plurality of electric motors to provide power to the plurality of electric motors independent of the electric generator, the at least one controller being operative to cause power to be supplied from the at least one storage device via the high voltage bus to the plurality of electric motors independent of the electric generator, the at least one controller being further operative to cause power to be supplied from the generator via the high voltage bus to the plurality of electric motors independent of the at least one storage device;

a first operator input actuatable by an operator of the vehicle, the first operator input being operatively coupled to the at least one controller to provide a zero point turn request to the at least one controller;

a second operator input actuatable by an operator of the vehicle, the second operator input being operatively coupled to the at least one controller to provide an indication of a requested zero point turn speed to the at least one controller; and a third operator input actuatable by an operator of the vehicle, the third operator input being operatively coupled to the at least one controller to provide an indication of a requested zero point turn direction to the at least one controller, wherein the first operator input, the second operator input, and the third operator input are independent of one another and, in response to the zero point turn request, the at least one controller controls the plurality of electric motors to execute a zero point turn having the requested zero point turn speed and the requested zero point turn direction.

25. The tracked all-terrain vehicle of claim 24, wherein, in executing the zero point turn, the at least one controller controls the first electric motor to move the left side continuous track in a forward direction and the second electric motor to move the right side continuous track in a reverse direction when the requested zero point turn direction is clockwise.

26. The tracked all-terrain vehicle of claim 24, wherein, in executing the zero point turn, the at least one controller controls the first electric motor to move the left side continuous track in a reverse direction and the second electric motor to move the right side continuous track in a forward direction when the requested zero point turn direction is counterclockwise.

27. The tracked all-terrain vehicle of claim 24, wherein, in response to the zero point turn request, the at least one controller determines a power demand of the first electric motor and the second electric motor to achieve the requested zero point turn speed and the requested zero point turn direction and controls an output of the internal combustion engine based on the determined power demand of the first electric motor and the second electric motor.

28. A tracked all-terrain vehicle, comprising:

a plurality of ground engaging members including a right side endless track assembly including a right side continuous track and a left side endless track assembly including a left side continuous track;

a frame supported by the plurality of ground engaging members;

a plurality of electric motors supported by the plurality of ground engaging members, the plurality of electric motors including a first electric motor operatively coupled to the left side endless track assembly to drive movement of the left side continuous track and a second electric motor operatively coupled to the right side endless track assembly to drive movement of the right side continuous track independent of the left side continuous track;

at least one controller operatively coupled to the plurality of electric motors;

an internal combustion engine supported by the plurality of ground engaging members and operatively coupled to the at least one controller;

an electric generator driven by the internal combustion engine, the electric generator being operatively coupled to the plurality of electric motors to provide power to the plurality of electric motors;

a speed monitoring device supported by the plurality of ground engaging members and operatively coupled to the at least one controller to provide an indication of a ground speed of the vehicle;

a first operator input actuatable by an operator of the vehicle, the first operator input being operatively coupled to the at least one controller to provide an indication of a requested vehicle speed to the at least one controller;

a second operator input actuatable by an operator of the vehicle, the second operator input being operatively coupled to the at least one controller to provide an indication of a requested vehicle travel direction to the at least one controller, wherein the at least one controller based on the indication of the ground speed of the vehicle, the indication of the requested vehicle speed, and the indication of the requested vehicle travel direction determines a power demand of the first electric motor and the second electric motor to achieve the requested vehicle speed and the requested vehicle direction and controls an output of the internal combustion engine based on the determined power demand of the plurality of electric motors;

at least one storage device, the at least one controller providing a first part of the determined power demand of the first electric motor and the second electric motor from energy stored in the at least one storage device and a second part of the determined power demand of the first electric motor and the second electric motor from the internal combustion engine through the generator, the first part being provided for a first time period and the second part being provided during a second time period, the second time period being longer than the first time period, wherein the second part provides all of the determined power demand.

* * * * *